US009906978B1

(12) United States Patent
Yunoki et al.

(10) Patent No.: US 9,906,978 B1
(45) Date of Patent: Feb. 27, 2018

(54) COMMUNICATION TERMINAL

(71) Applicant: HITACHI, LTD., Tokyo (JP)

(72) Inventors: Shoji Yunoki, Tokyo (JP); Hiroyuki Kubo, Tokyo (JP); Hideki Endo, Tokyo (JP); Shouta Takagi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/461,017

(22) Filed: Mar. 16, 2017

(30) Foreign Application Priority Data

Oct. 21, 2016 (JP) ................................ 2016-206684

(51) Int. Cl.
*H04L 1/00* (2006.01)
*H04W 28/02* (2009.01)
*H04L 12/26* (2006.01)
*H04L 1/02* (2006.01)
*H04W 88/06* (2009.01)
*H04L 5/00* (2006.01)
(Continued)

(52) U.S. Cl.
CPC ........... *H04W 28/0289* (2013.01); *H04L 1/02* (2013.01); *H04L 43/0888* (2013.01); *H04B 7/02* (2013.01); *H04B 7/06* (2013.01); *H04L 1/0002* (2013.01); *H04L 1/0018* (2013.01); *H04L 5/00* (2013.01); *H04L 45/12* (2013.01); *H04L 45/30* (2013.01); *H04W 88/06* (2013.01)

(58) Field of Classification Search
CPC ... H04L 1/0002; H04L 1/0018; H04L 1/0033; H04L 1/02; H04L 5/00; H04L 45/12; H04L 45/121; H04L 45/24; H04L 45/30; H04B 7/06; H04B 7/0613; H04B 7/068
See application file for complete search history.

(56) References Cited

U.S. PATENT DOCUMENTS 8,593,976 B2 * 11/2013 Kishigami ............... H04B 7/04
370/252
8,611,417 B2 * 12/2013 Pantelidou ............ H04L 1/0002
370/465

(Continued)

OTHER PUBLICATIONS

Yunoki et al. "Multi-route Vehicle-to-vehicle Communication via Cellular Networks";The Institute of Electronics, Information and Communication Engineers; Communication Society Meeting Lecture Papers; The Institute of Electronics, Information and Communication Engineers, Aug. 25, 2015, 2015—Report (1), p. 388.

*Primary Examiner* — Duc M Nguyen
(74) *Attorney, Agent, or Firm* — Volpe and Koenig, P.C.

(57) ABSTRACT

The object of the invention is to realize a low delay communication in a mobile communication terminal and a communication system including the mobile communication terminal, even in a state in which an amount of generation of data per unit time of the mobile communication terminal exceeds a transmission speed of a certain communication carrier. A communication terminal according to one embodiment of the present invention includes a plurality of communication interfaces capable of connecting to a plurality of different communication systems, and replicates and transmits identical transmission data having a sequence number assigned via either a portion or all of the plurality of communication interfaces. In replicating transmission data, a replication count is determined based on a generation speed of the transmission data, and transmission speeds of the respective communication interfaces.

15 Claims, 23 Drawing Sheets

(51) Int. Cl.
    *H04L 12/721*        (2013.01)
    *H04L 12/725*        (2013.01)
    *H04B 7/06*           (2006.01)
    *H04B 7/02*           (2018.01)

(56) References Cited

U.S. PATENT DOCUMENTS

| | | | |
|---|---|---|---|
| 9,215,498 B2* | 12/2015 | Liu | H04L 1/007 |
| 2004/0013180 A1* | 1/2004 | Giannakis | H04L 1/0054 |
| | | | 375/219 |
| 2009/0010355 A1* | 1/2009 | Mori | H04B 7/0615 |
| | | | 375/267 |
| 2011/0182196 A1* | 7/2011 | Yunoki | H04L 1/1822 |
| | | | 370/252 |
| 2013/0185417 A1* | 7/2013 | Yunoki | H04L 43/08 |
| | | | 709/224 |

* cited by examiner

TRANSMISSION SPEED OF COMMUNICATION IF 1
(COMMUNICATION CARRIER 1) [bps]

410-1 , 420-1

| TIME | CURRENT LOCATION | | |
| --- | --- | --- | --- |
| | AREA A | AREA B | AREA C |
| 00[h]:00[m]:00.000[s]-05[h]:59[m]:59.999[s] | 1500000 | 2000000 | 1500000 |
| 06[h]:00[m]:00.000[s]-17[h]:59[m]:59.999[s] | 1500000 | 1500000 | 1300000 |
| 18[h]:00[m]:00.000[s]-23[h]:59[m]:59.999[s] | 1200000 | 1300000 | 1100000 |

307-2

TRANSMISSION SPEED OF COMMUNICATION IF 2
(COMMUNICATION CARRIER 2) [bps]

410-2 , 420-2

| TIME | CURRENT LOCATION | | |
| --- | --- | --- | --- |
| | AREA A | AREA B | AREA C |
| 00[h]:00[m]:00.000[s]-05[h]:59[m]:59.999[s] | 900000 | 500000 | 800000 |
| 06[h]:00[m]:00.000[s]-17[h]:59[m]:59.999[s] | 900000 | 600000 | 600000 |
| 18[h]:00[m]:00.000[s]-23[h]:59[m]:59.999[s] | 500000 | 400000 | 700000 |

307-3

TRANSMISSION SPEED OF COMMUNICATION IF 3
(COMMUNICATION CARRIER 3) [bps]

410-3 , 420-3

| TIME | CURRENT LOCATION | | |
| --- | --- | --- | --- |
| | AREA A | AREA B | AREA C |
| 00[h]:00[m]:00.000[s]-05[h]:59[m]:59.999[s] | 800000 | 600000 | 800000 |
| 06[h]:00[m]:00.000[s]-17[h]:59[m]:59.999[s] | 600000 | 500000 | 700000 |
| 18[h]:00[m]:00.000[s]-23[h]:59[m]:59.999[s] | 600000 | 800000 | 800000 |

| ENTRY | VALUE |
|---|---|
| DATA GENERATION SPEED | 1000000[bps] |
| DATA SIZE | 12000[bit] |
| PACKET GENERATION INTERVAL | 0.012[s] |
| TRANSMISSION SPEED $b_1$ | 1500000[bps] |
| TRANSMISSION SPEED $b_2$ | 900000[bps] |
| TRANSMISSION SPEED $b_3$ | 800000[bps] |

Fig. 12

CURRENT TIME : 0[h]:0[m]:1.000[s]   1210   1213   1214

|  | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF 1 | 1500000 | 0 | 0 |
| COMMUNICATION IF 2 | 900000 | 0 | 1.0133 |
| COMMUNICATION IF 3 | 800000 | 0 | 1.015 |

CURRENT TIME : 0[h]:0[m]:1.012[s]   1220   1223   1224

|  | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF 1 | 1500000 | 0 | 0 |
| COMMUNICATION IF 2 | 900000 | 1.0133 | 1.0266 |
| COMMUNICATION IF 3 | 800000 | 0 | 1.027 |

CURRENT TIME : 0[h]:0[m]:1.024[s]   1230   1233   1234

|  | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF 1 | 1500000 | 0 | 0 |
| COMMUNICATION IF 2 | 900000 | 1.0266 | 1.0399 |
| COMMUNICATION IF 3 | 800000 | 0 | 1.039 |

CURRENT TIME : 0[h]:0[m]:1.036[s]   1240   1243   1244

|  | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF 1 | 1500000 | 0 | 0 |
| COMMUNICATION IF 2 | 900000 | 1.0266 | 1.0499 |
| COMMUNICATION IF 3 | 800000 | 1.039 | 1.054 |

Fig. 14
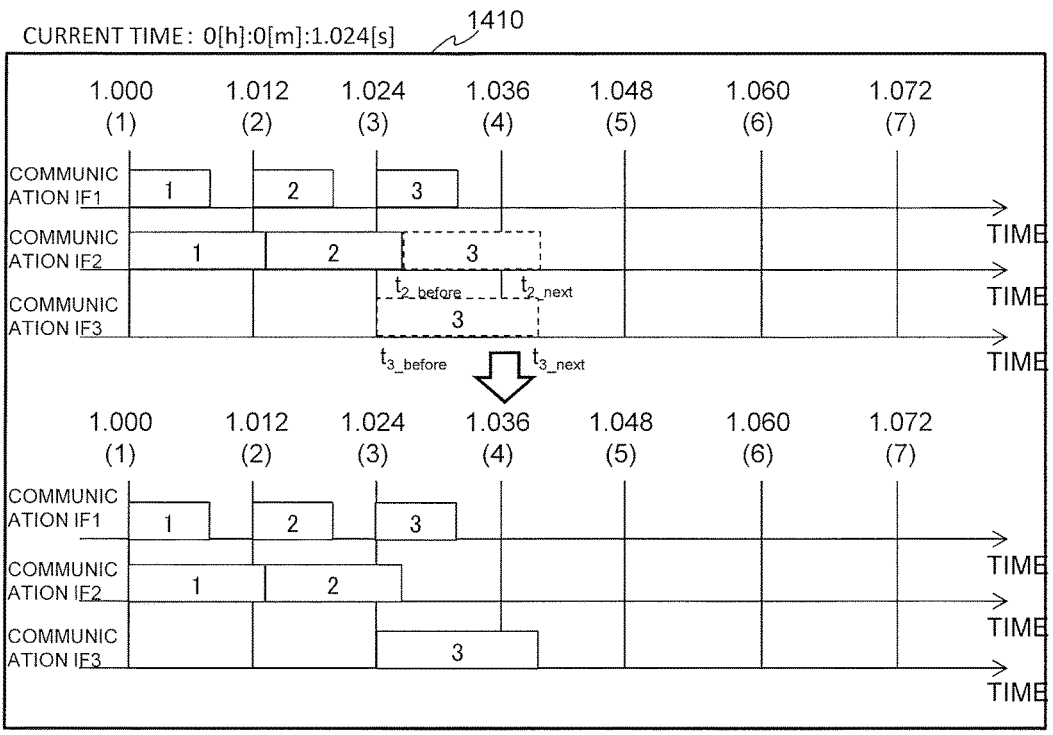
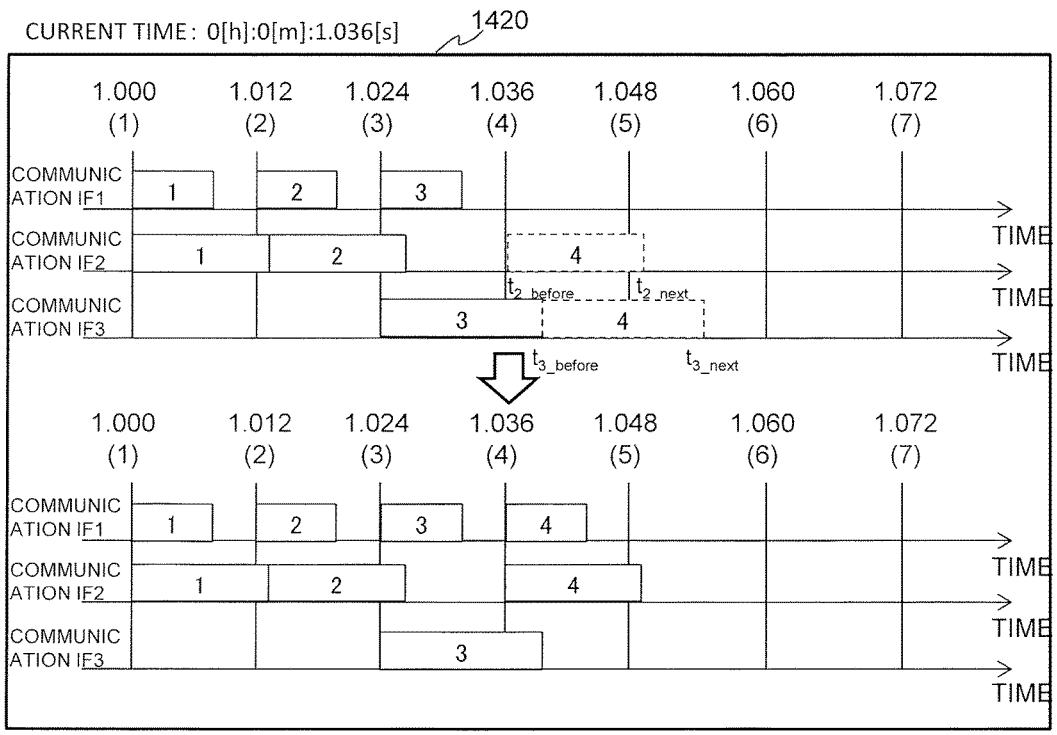

Fig. 19

1910
CURRENT TIME: 0[h]:0[m]:1.000[s]

| | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF1 | 1500000 | 0 | 0 |
| COMMUNICATION IF2 | 900000 | 0 | 1.0133 |
| COMMUNICATION IF3 | 800000 | 0 | 1.015 |

1920
CURRENT TIME: 0[h]:0[m]:1.012[s]

| | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF1 | 1500000 | 0 | 0 |
| COMMUNICATION IF2 | 900000 | 1.0133 | 1.0266 |
| COMMUNICATION IF3 | 800000 | 1.015 | 1.030 |

1930
CURRENT TIME: 0[h]:0[m]:1.024[s]

| | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF1 | 1500000 | 0 | 0 |
| COMMUNICATION IF2 | 900000 | 1.0266 | 1.400 |
| COMMUNICATION IF3 | 800000 | 1.015 | 1.039 |

1940
CURRENT TIME: 0[h]:0[m]:1.036[s]

| | TRANSMISSION SPEED $b_i$ [bps] | PREVIOUS DATA TRANSMISSION COMPLETION TIME $t_{i\_before}$ [s] | NEXT DATA TRANSMISSION COMPLETION TIME $t_{i\_next}$ [s] |
|---|---|---|---|
| COMMUNICATION IF1 | 1500000 | 0 | 0 |
| COMMUNICATION IF2 | 900000 | 1.040 | 1.0533 |
| COMMUNICATION IF3 | 800000 | 1.039 | 1.054 |

Fig. 21
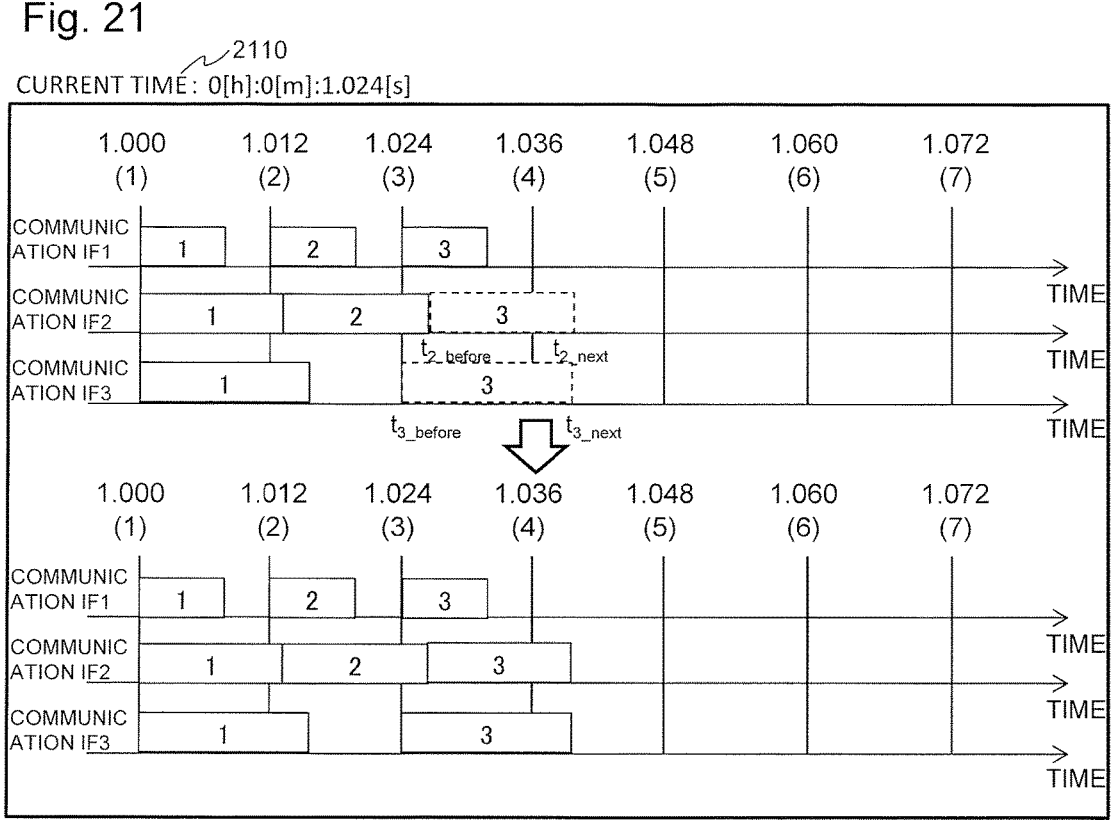
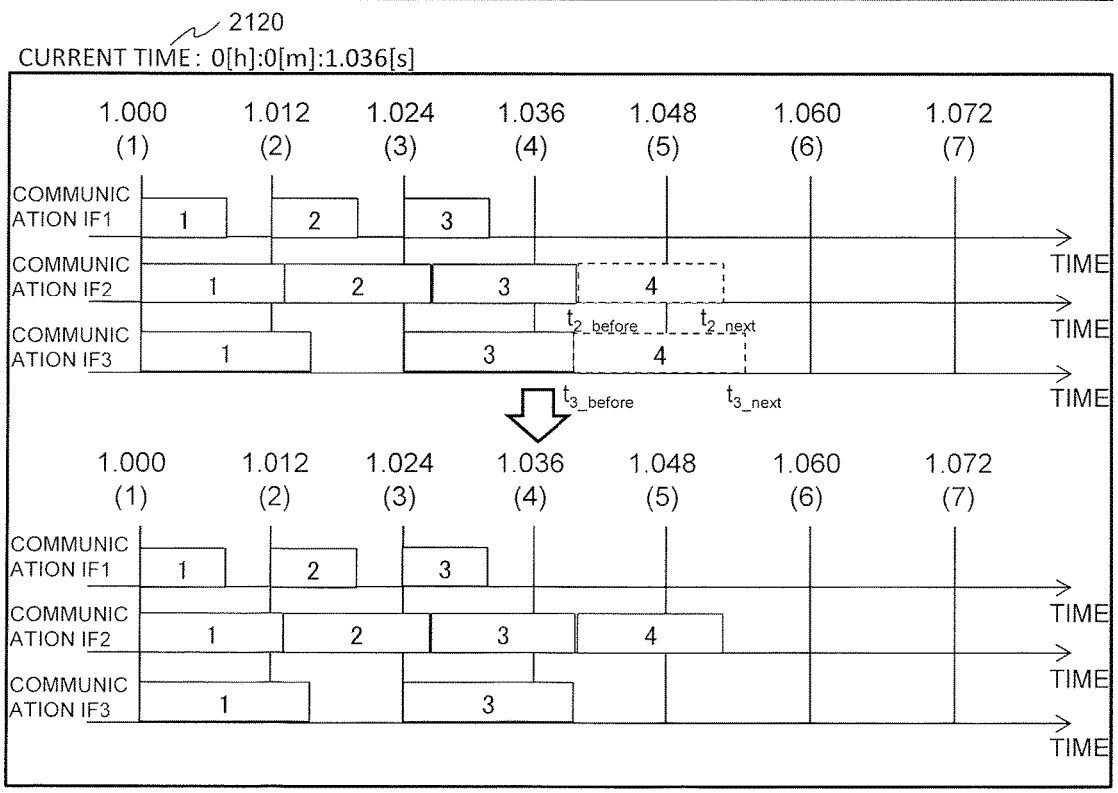

COMMUNICATION TERMINAL

CROSS-REFERENCE TO RELATED APPLICATIONS

The present application claims priority to Japanese Patent Application No. 2016-206684, filed Oct. 21, 2016. The contents of this application are incorporated herein by reference in their entirety.

FIELD OF THE INVENTION

The present invention relates to a communication terminal capable of communicating via a plurality of different networks.

DESCRIPTION OF THE RELATED ART

There are increasing expectations for IoT (Internet of Things) services performing automatic recognition, automatic control, telemetering and so on, by providing a communication function not only to information and communication devices such as computers but also to various things. One example of such IoT service is a case where a communication equipment is provided on a mobile object such as an automobile, such that the mobile objects functions as a mobile communication terminal, and the terminal communicates data with a server. Communication carriers provide a wireless communication service of a measured rate utilizing an existing cellular network realizing a wide coverage for use in such forms of IoT services.

According to the above-described form of IoT service, a use case is considered in which sensing data and the like are transmitted in real time from the mobile communication terminal via a communication network to the server, and the server performs control based on the analysis result of such data. For example, in a remote control service in which image sequences acquired through an on-vehicle camera are transmitted to the server, and an operator at the server performs control of the vehicle based on the image sequences, the surrounding environments of the vehicle are changed from moment to moment, and the images must be transmitted to the server with a one-way delay in the order of tens of milliseconds.

"Multi-route Vehicle-to-vehicle Communication via Cellular Networks"; Shoji Yunoki and three others; The Institute of Electronics, Information and Communication Engineers; Communication Society Meeting Lecture Papers; The Institute of Electronics, Information and Communication Engineers, Aug. 25, 2015, 2015-Report (1), p. 388 (Non-Patent Literature 1) discloses a multi-route communication technique, which is one example of the techniques for satisfying such demands. In the multi-route communication technique, a transmission source device replicates data to be transmitted, and transmits replicated data to a reception destination apparatus using communication systems operated by a plurality of different communication carriers. The reception destination apparatus utilizes the data that has arrived earliest among the received replicated data. As described, it becomes possible to ensure low delay communication in multi-route communication, even in a state where communication quality has been deteriorated, such as a decrease of transmission speed or an increase of communication delay.

SUMMARY OF THE INVENTION

Problems to be Solved by the Invention

Even in a case where the multi-route communication technique taught in Non-Patent Literature 1 is adopted, if an amount of data that the mobile communication terminal generates per unit time exceeds the transmission speed of a certain communication carrier, sensing data will constantly be transmitted in a delayed manner via that communication carrier. Therefore, low delay communication cannot be ensured.

Means for Solving the Problems

A communication terminal according to one preferred embodiment of the present invention includes a processor and a plurality of communication interfaces. The processor executes an application program generating data, creates a plurality of replicated data of the data, and transmits the respective replicated data via different communication interfaces. The plurality of communication interfaces include a first type of communication interface having a transmission speed equal to or greater than a data generation speed of the processor, and a second type of communication interface having a transmission speed smaller than the data generation speed, wherein the communication interfaces are respectively connected to different networks.

The processor observes a data generation speed during execution of the application program, determines, based on a total transmission speed of a second type of communication interface and a generation speed, an amount of the replicated data (N2) to be transmitted using the second type of communication interface, determines a replicated quantity of data (N) based on a number of communication interfaces of a first type (N1) and the amount of replicated data (N2), and generates a number of the replicated data corresponding to the replicated quantity (N). Then, the processor transmits the N1 number of replicated data in parallel using all the communication interfaces of the first type, selects the same number of communication interfaces of the second type as the number of remaining replicated data, and transmits the remaining replicated data using the selected second type of communication interfaces.

Effects of the Invention

Regarding a mobile communication terminal and a communication system including the mobile communication terminal, a low delay communication can be realized even in a state where there is a communication carrier having a transmission speed lower than a data quantity that the mobile communication terminal generates per unit time.

BRIEF DESCRIPTION OF THE DRAWINGS

FIG. 4 is an example of a communication quality table.

FIG. 12 is a calculation example of a data transmission completion time.

FIG. 14 is a view illustrating an example of selection of communication IFs.

FIG. 19 is a calculation example of a data transmission completion time according to the second embodiment.

FIG. 21 is an example of selection of communication IFs according to the second embodiment.

DESCRIPTION OF THE EMBODIMENTS

Now, some embodiments will be described with reference to the drawings.

Figure 1:
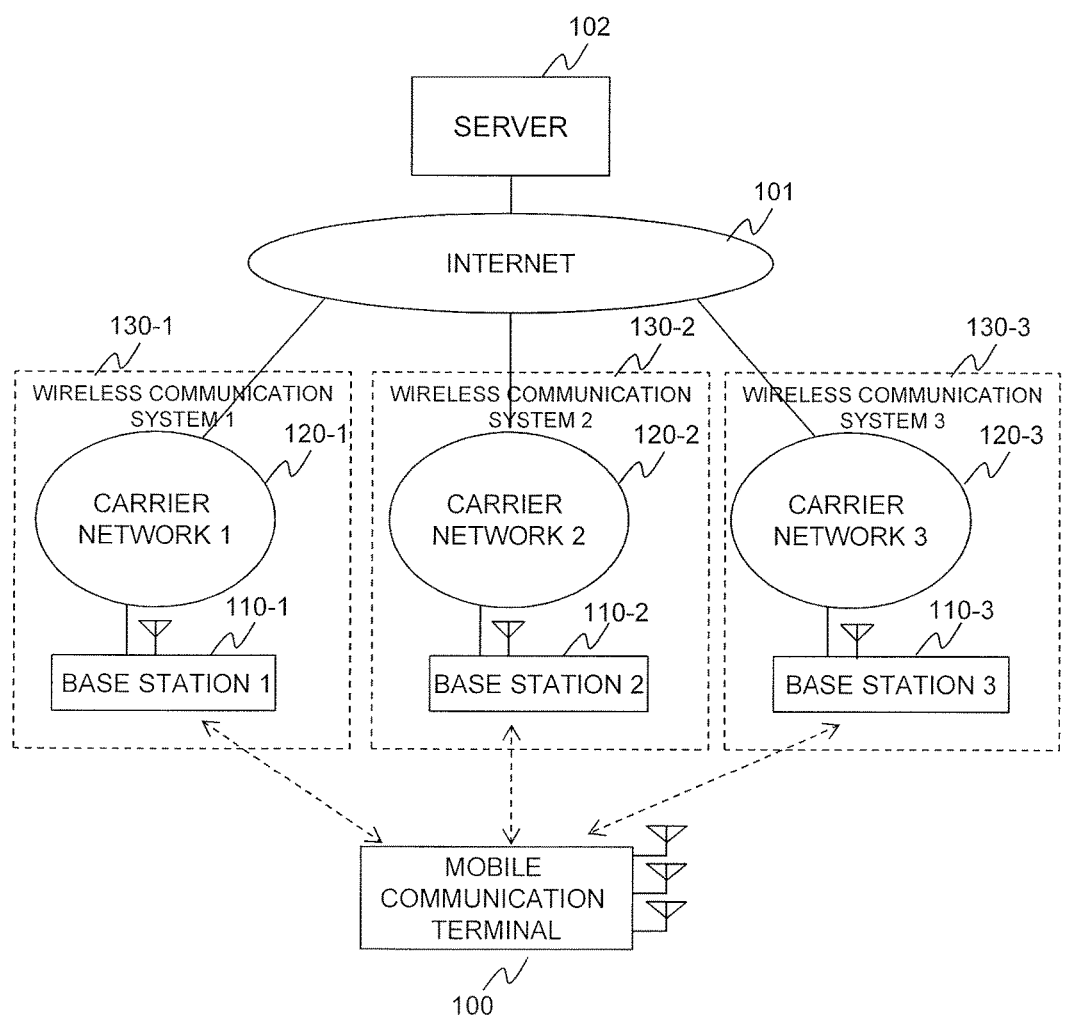
FIG. 1 is a configuration diagram of a communication system.

Now, a configuration of a communication system according to the respective embodiments illustrated below will be described with reference to FIG. 1. According to the communication system of the respective embodiments described below, it is assumed that a mobile communication terminal 100 connects to the Internet 101 via wireless communication systems 130 each including a base station 110 and a carrier network 120 operated by a plurality of different communication carriers (1 through 3), and data is communicated with a server 102. FIG. 1 illustrates an example where there are three communication carriers, but the number of communication carriers can be four or more. In the following description, an i-th communication carrier is referred to as a "communication carrier i" (wherein i is an integer of 1 or greater). The base station 110, the carrier network 120 and the wireless communication system 130 managed by the communication carrier i are respectively referred to as "base station i", "carrier network i" and "wireless communication system i", and denoted by reference numbers "110-$i$", "120-$i$" and "130-$i$".

The mobile communication terminal 100 performs transmission and reception of data with a server 102 and provides an IoT service to a user based on an instruction of the installed application program. The mobile communication terminal 100 can connect to wireless communication systems 130 operated by a plurality of different communication carriers. The mobile communication terminal 100 replicates and transmits a portion or all of the data generated by the installed application program via each wireless communication system 130.

The wireless communication system 130 includes a plurality of base stations 110 that directly communicate with the mobile communication terminal 100 using radio waves, and a carrier network 120 serving as a backbone network that integrates the plurality of base stations 110 and connects them to the Internet 101. The wireless communication system 130 is realized, for example, by a cellular network. In FIG. 1, only one base station 110 is illustrated in each wireless communication system 130, but actually, a plurality of base stations 110 exist within each wireless communication system 130.

The server 102 performs transmission and reception of data with the mobile communication terminal 100. Further, in receiving data transmitted from the mobile communication terminal 100, the server 102 has a function to discard redundant data by referring to a sequence number assigned to the received data.

First Embodiment

The mobile communication terminal 100 and the server 102 according to the first embodiment of the present invention are described with reference to FIGS. 2 through 16.

Figure 2:
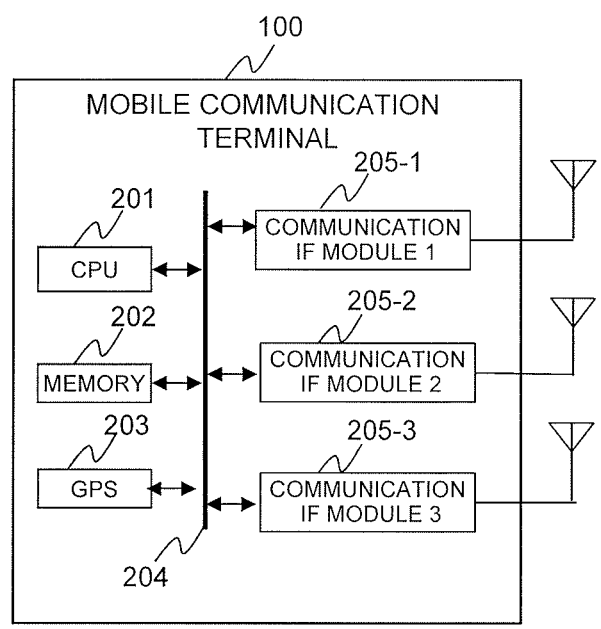
FIG. 2 is a physical configuration diagram of a mobile communication terminal.

FIG. 2 is a physical configuration diagram of the mobile communication terminal 100. The mobile communication terminal 100 includes a CPU (processor) 201, a memory 202, a GPS (Global Positioning System) module 203 (abbreviated as "GPS 203" in FIG. 2), a plurality of communication interface modules (abbreviated as "communication IF module" in FIG. 2) 205, and a bus 204 connecting these components. The GPS module 203 receives a current time transmitted from a satellite, and provides the current time to the CPU 201. Further, the GPS module 203 calculates a current position of the mobile communication terminal 100 based on signals received from a plurality of satellites, and provides information of the calculated current position to the CPU 201.

The respective communication IF modules 205 are modules capable of connecting with different wireless communication systems 130, and perform data transmission according to an instruction from the CPU 201. The plurality of communication IF modules 205 can transmit data simultaneously, that is, in parallel.

The memory 202 stores a program performing a data transmission/reception process of the mobile communication terminal 100 (hereinafter referred to as "control program") and an application program providing an IoT service to the user, and the CPU 201 is configured to execute these programs stored in the memory 202.

In the following description, an i-th (i is a integer of 1 or greater) communication IF module 205 among the plurality of communication IF modules 205 is referred to as a "communication IFi", and the reference number of communication IFi may be referred to as "205-$i$". The communication IFi is a module through which the mobile communication terminal 100 communicates with the server 102 via the communication carrier i. Further, a plurality of communication IF modules 205 are generally also simply referred to as "communication IF".

Figure 3:
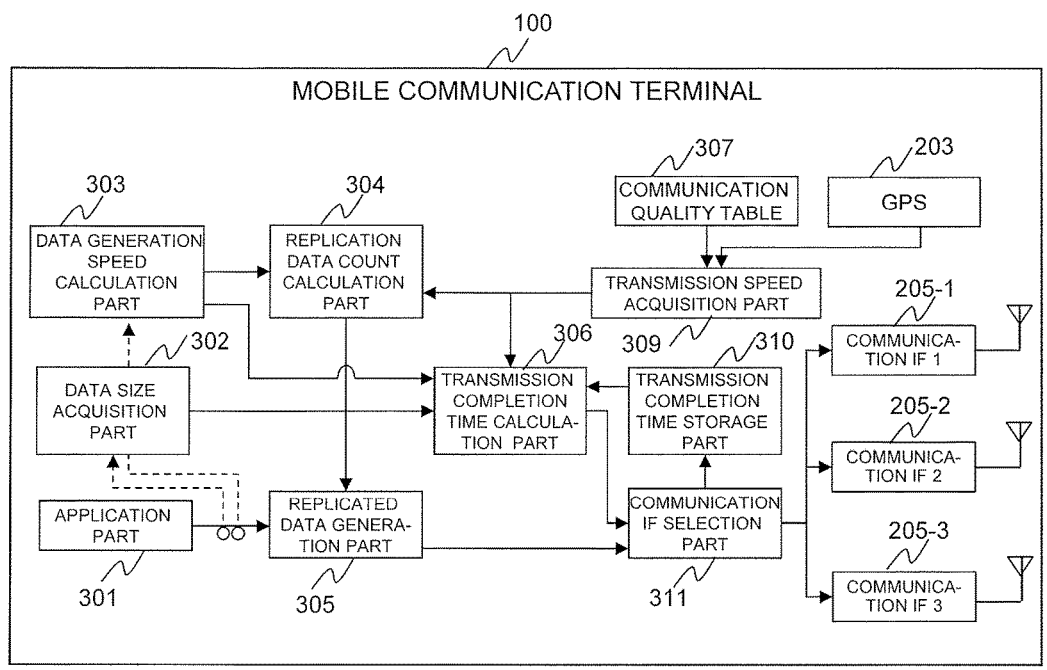
FIG. 3 is a functional block diagram of the mobile communication terminal.

FIG. 3 is a function block diagram of the mobile communication terminal 100. The mobile communication terminal 100 includes an the application part 301, a data size acquisition part 302, a data generation speed calculation part 303, a replication data count calculation part 304, a replicated data generation part 305, a transmission completion time calculation part 306, a communication quality table 307, a transmission speed acquisition part 309, a transmission completion time storage part 310, and a communication IF selection part 311.

In the present embodiment, these function parts are implemented by software (programs). Specifically, the application part 301 is a function part realized by the CPU 201 executing the application program stored in the memory 202. Further, the CPU 201 executes the control program stored in the memory 202 to operate the mobile communication terminal 100 as an apparatus equipped with the data size acquisition part 302, the data generation speed calculation part 303, the replication data count calculation part 304, the replicated data generation part 305, the transmission completion time calculation part 306, the communication quality table 307, the transmission speed acquisition part 309, the transmission completion time storage part 310, and the communication IF selection part 311.

However, these function parts are not necessarily realized by software. A portion or all of the function parts described above can be composed using hardware such as FPGA (Field Programmable Gate Array) or ASIC (Application Specific Integrated Circuit).

The application part 301 is a function that generates data to be transmitted to the server 102, and enters the generated data to the replicated data generation part 305.

The data size acquisition part 302 acquires the size of the data that the application part 301 enters to the replicated data generation part 305.

The data generation speed calculation part 303 observes the data generation speed, which is the speed in which the application part 301 generates the data to be entered to the replicated data generation part 305, and enters the observed data generation speed to the replication data count calculation part 304 or the transmission completion time calculation part 306.

The replication data count calculation part 304 determines a replication data count based on the data generation speed entered from the data generation speed calculation part 303 and the transmission speeds of the respective communication IFs 205 entered from the transmission speed acquisition part 309, and enters the determined replication data count to the replicated data generation part 305.

The replicated data generation part 305 receives data from the application part 301, and receives the replication data count from the replication data count calculation part 304. The replicated data generation part 305 generates a same number of replica of data received from the application part 301 as the replication data count received from the replication data count calculation part 304, and enters the generated data, i.e., replicated data, to the communication IF selection part 311.

The transmission completion time calculation part 306 calculates a transmission completion time of a next transmission packet, i.e., next data transmission completion time, based on a previous data transmission completion time acquired from the transmission completion time storage part 310, the transmission speeds of the respective communication IFs 205 entered from the transmission speed acquisition part 309, and the data size entered from the data size acquisition part 302.

The communication quality table 307 is a table that stores transmission speeds of the respective communication IFs 205. Since the transmission speeds of the respective communication IFs 205 may differ according to the position of the mobile communication terminal 100 or the time, and the transmission speeds of the respective communication IFs 205 related to position and time are stored in the communication quality table 307.

The transmission speed acquisition part 309 refers to the communication quality table 307 based on the current time and current position entered from the GPS 203, and acquires the transmission speeds of the respective communication IFs 205 corresponding to the current time and current position entered from the GPS 203.

The transmission completion time storage part 310 is a storage area storing the previous data transmission completion time entered from the communication IF selection part 311.

The communication IF selection part 311 receives one or more data entered from the replicated data generation part 305, and counts the number of received data. The communication IF selection part 311 selects, based on the next data transmission completion time of the respective communication IFs 205 entered from the transmission completion time calculation part 306, the communication IF(s) 205 for transmitting one or more data entered from the replicated data generation part 305, and transmits data via the communication IF(s) 205 by assigning the same sequence number to the one or more data.

<Process Flow of Transmission Speed Acquisition Part 309>

FIG. 4 illustrates an example of the communication quality table 307 that the transmission speed acquisition part 309 refers to.

In the present embodiment, the communication quality table 307 is provided for each communication carrier (or each communication IF module 205), and a reference number "307-$i$" is assigned to the communication quality table 307 corresponding to the communication carrier i. In a state where the transmission speed acquisition part 309 acquires the transmission speed of the communication IFi of a certain time t, it refers to a time 410-$i$ of each row included in the communication quality table 307-$i$, and specifies a row including the time t within the range of the time 410-$i$. Then, the transmission speed acquisition part 309 verifies which area (among areas A, B and C) within the current location 420-$i$ column the current location acquired by the GPS 203 is included in.

For example, in a state where the current time is two o'clock and the current location is included in "area B", when acquiring the transmission speed of the communication IF 1, the transmission speed acquisition part 309 refers to the value stored where the current location 420-1 is "area B" in a row where the time 410-1 of the communication quality table 307-1 is "00 [h]:00 [m]:00.000 [s]-05 [h]:59 [m]:59.999 [s]", to recognize that the transmission speed of the communication IF 1 is 2000000 (bps).

Figure 5:
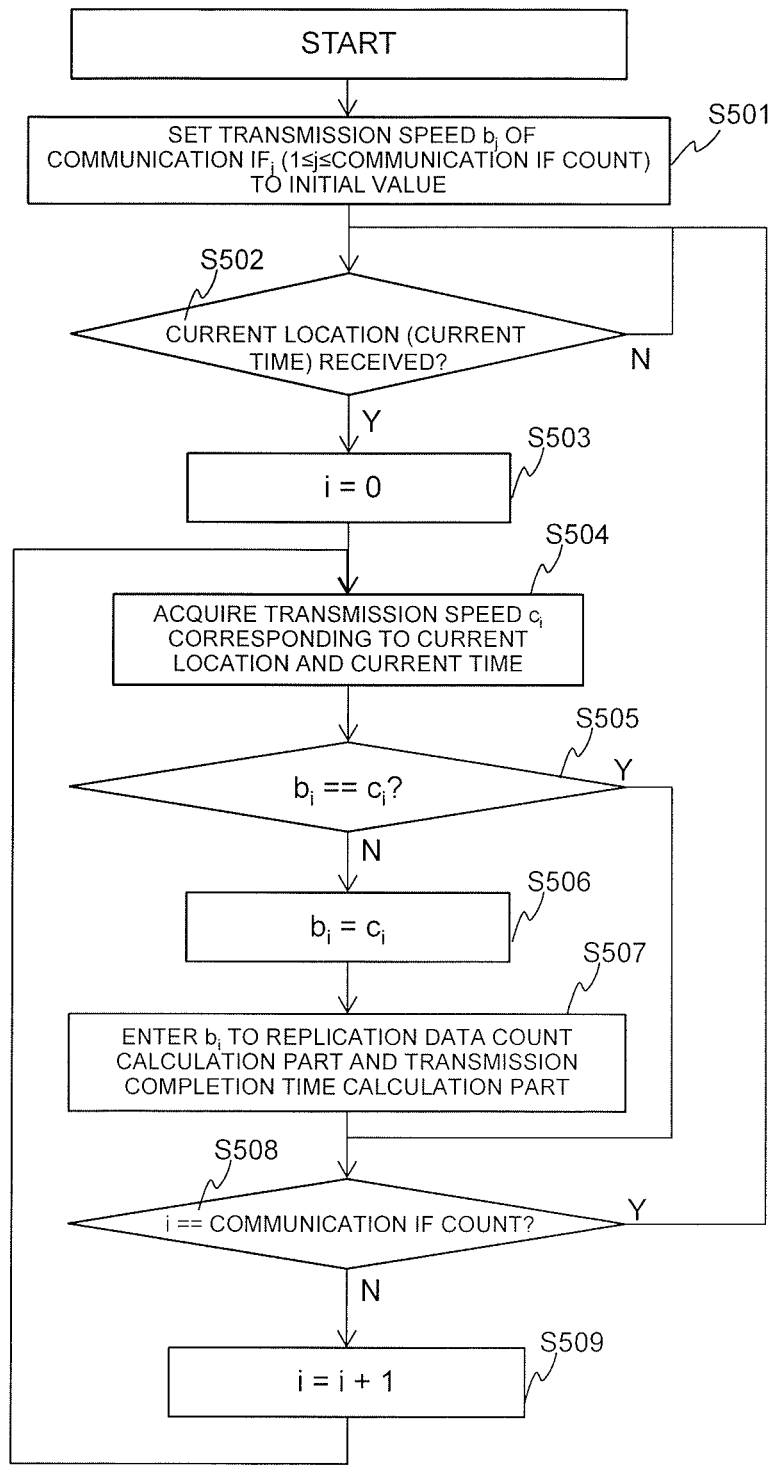
FIG. 5 is a processing flowchart of a transmission speed acquisition part.

FIG. 5 illustrates a processing flowchart of the transmission speed acquisition part 309. The transmission speed acquisition part 309 has a storage area (variable) storing information regarding the transmission speeds of the respective communication IFs. In the following description, a storage area storing the transmission speed of the communication IFi is denoted as $b_i$. Unless stated otherwise, the number of the communication IF module 205 of the mobile communication terminal 100 is set to m (m is an integer value greater than 1). FIGS. 2 and 3 illustrate an example where m=3.

Further, "S" assigned before the reference number in the processing flowchart of FIG. 5 and so on refer to a "step". Further, among the expressions illustrated in the processing flowcharts of FIG. 5 and so on, the expression having a left side and a right side joined by "=" means that it is a process in which the value of the right side is substituted to the left side. Further, the expression having the left side and the right side joined by "=" means that the value on the left side and the value on the right side are in an equal state, and if this expression is used in a determination processing (such as S505 described below), it means that the determination processing is a processing determining whether the value on the left side and the value on the right side are equal or not.

At first, the transmission speed acquisition part 309 sets the transmission speed $b_j$ (j=1, 2, . . . m) of the respective communication IFs to an initial value (0) (S501). Next, the transmission speed acquisition part 309 checks whether the current position or the current time has been received from the GPS 203 (S502), advances to S502 if it has not been received, and advances to S503 if it has been received.

In S503, the transmission speed acquisition part 309 prepares a variable i, and initializes i to 0. Next, the transmission speed acquisition part 309 refers to the communication quality table 307 of communication IFi, and acquires the transmission speed (referred to as "$c_i$") corresponding to the current position and current time (S504).

Thereafter, the transmission speed acquisition part 309 checks whether the acquired transmission speed $c_i$ is equal to $b_i$ (S505), wherein the procedure advances to S508 if it is equal, and to S506 if it is not equal. In S506, the transmission speed acquisition part 309 substitutes the acquired transmission speed $c_i$ to $b_i$. Then, the transmission speed acquisition part 309 enters $b_i$ to the replication data count calculation part 304 and the transmission completion time calculation part 306 (S507).

In S508, the transmission speed acquisition part 309 checks whether i is equal to the communication IF count, wherein the procedure advances to S502 if it is equal, and to S509 if it is not equal. In S509, the transmission speed acquisition part 309 adds 1 to i, and advances to S504.

For example, we will assume a case where the mobile communication terminal 100 is in area B and the current time acquired from the GPS 203 is 03 [h]:00 [m]:00.000 [s], and the mobile communication terminal 100 has the communication quality tables 307-1, 307-2 and 307-3 illustrated in FIG. 4. The transmission speeds of the respective communication IFs are; $b_1$=2000000, $b_2$=500000, and $b_3$=600000. Now, the process performed by the transmission speed acquisition part 309 in a state where the mobile communication terminal 100 moves to area A at 03 [h]:00 [m]:00.010 [s] (current time acquired from GPS 203) will be described. By executing S504 after the movement, the transmission speed acquisition part 309 acquires $c_1$=1500000, $c_2$=900000, and $c_3$=800000 from the communication quality table 307. In this case, $b_1$, $b_2$, and $b_3$ are respectively updated to $c_1$, $c_2$, and $c_3$ since $b_1 \neq c_1$, $b_2 \neq c_2$, and $b_3 \neq c_3$ (S505 and S506), and the transmission speed acquisition part 309 enters the updated $b_1$, $b_2$, and $b_3$ to the replication data count calculation part 304 and the transmission completion time calculation part 306 (S507).

<Processing of Replication Data Count Calculation Part>

Figure 6:
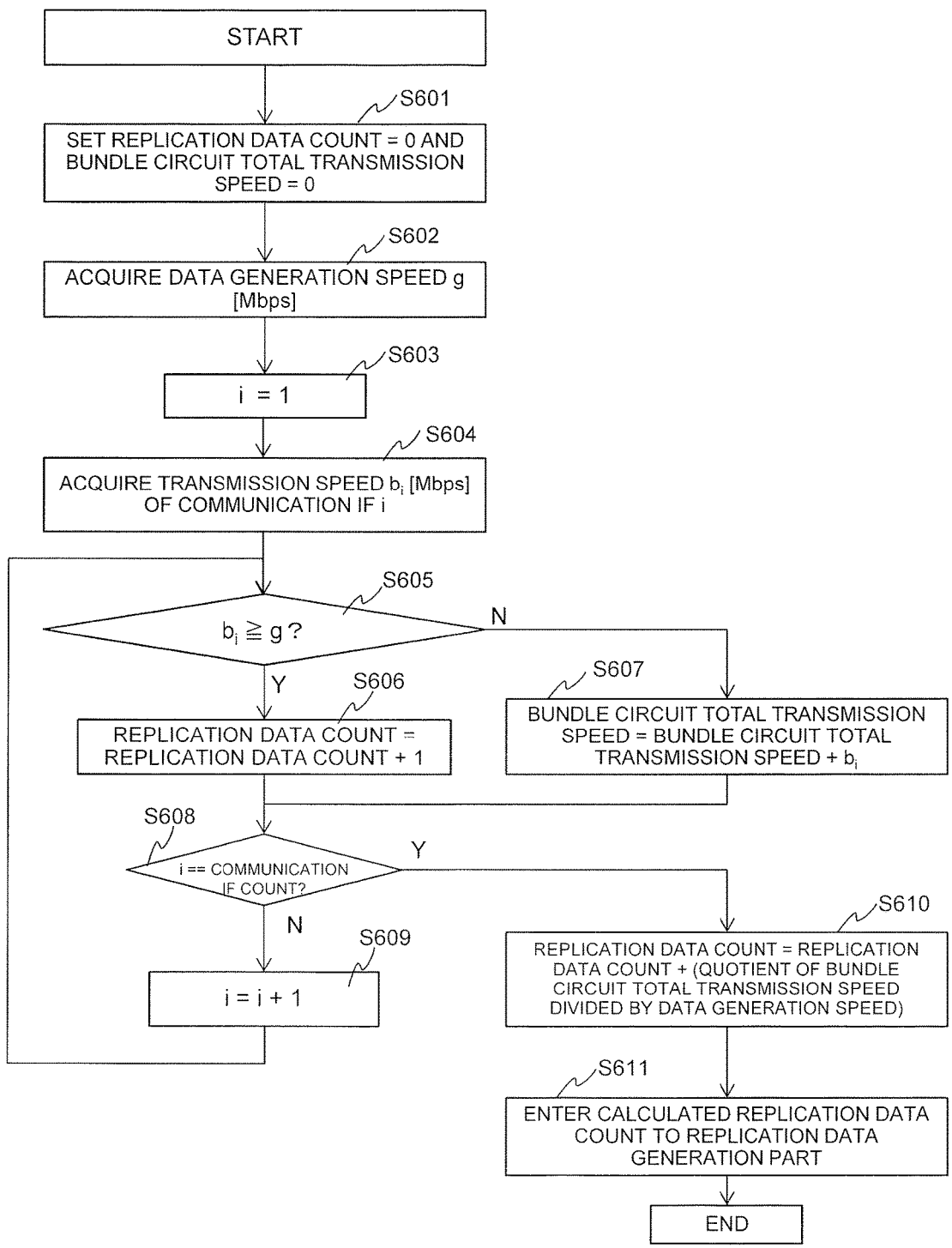
FIG. 6 is a processing flowchart of a replication data count calculation part.

A method for calculating replication data count executed by the replication data count calculation part 304 will be described with reference to FIG. 6. The replication data count calculation part 304 starts the processing at a timing in which the data generation speed calculation part 303 observes the data generation speed of the application part 301 and enters the data generation speed to the replication data count calculation part 304.

At first, in S601, the replication data count calculation part 304 prepares a variable $N_{int}$ for storing the replication data count, and a variable V for storing a bundle circuit total transmission speed, and initializes $N_{int}$ and V (by substituting 0). In the present specification, a "bundle circuit" is used as a term referring to a communication IF (or a communication path formed between the mobile communication terminal 100 and the server 102 by the communication IF) having a transmission speed smaller than the data generation speed of the application part 301. The bundle circuit total transmission speed is a total sum of the transmission speeds of all bundle circuits.

In S602, the replication data count calculation part 304 acquires the data generation speed of the application part 301 (referred to as g [bps]), and advances to S603. In S603, the replication data count calculation part 304 prepares a variable i, substitutes initial value (1) to i, and advances to S604.

In S604, the replication data count calculation part 304 acquires the transmission speed $b_i$ [bps] of the communication IFi from the transmission speed acquisition part 309, and advances to S605. In S605, the replication data count calculation part 304 compares $b_i$ and g to determine whether $b_i \geq g$, wherein the procedure advances to S606 if $b_i \geq g$, and to S607 if not $b_i \geq g$.

In S606, the replication data count calculation part 304 adds 1 to the replication data count $N_{int}$, and advances to S608. In S607, the replication data count calculation part 304 adds $b_i$ to the bundle circuit total transmission speed V, and advances to S608.

In S608, the replication data count calculation part 304 confirms whether i is equal to the communication IF count, wherein the procedure advances to S609 if it is not equal, and to S610 if it is equal. In S609, the replication data count calculation part 304 adds 1 to i, and advances to S605.

In S610, the replication data count calculation part 304 adds a quotient (V÷g) having divided the bundle circuit total transmission speed by the data generation speed to the replication data count $N_{int}$, and advances to S611. The value (V÷g) that the replication data count calculation part 304 adds to $N_{int}$ in S610 is an integer. That is, if V÷g includes a decimal part, the decimal part is rounded off, and only the integer part of V÷g is added. In S611, the replication data count calculation part 304 enters the calculated replication data count $N_{int}$ to the replicated data generation part 305, and ends the process.

<Specific Example of Processing of Replication Data Count Calculation Part>

A specific example of a method for calculating a replication data count by the replication data count calculation part 304 will be described with reference to the example illustrated in FIG. 7. In the present embodiment, as illustrated in FIG. 7, it is assumed that the application part 301 generates data having a predetermined size (size denoted in data size) at a certain interval (interval denoted in packet generation interval).

Figures 7, 8:
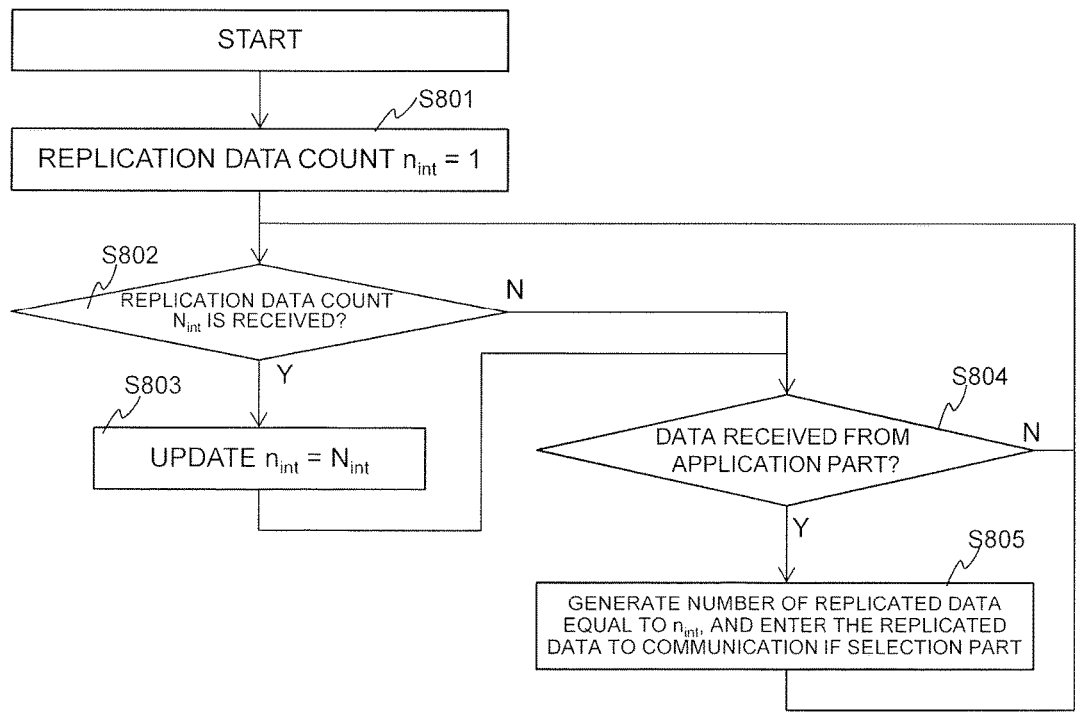
FIG. 7 is a view illustrating a pre-condition example.
FIG. 8 is a processing flowchart of a replicated data generation part.

The flow of processing performed by the replication data count calculation part 304 to compute the replication data count $N_{int}$ will be described when, as illustrated in FIG. 7, the data generation speed g of the application part 301 is 1000000 [bps], the number of communication IFs is three, and the transmission speeds of the respective communication IFs determined by the transmission speed acquisition part 309 are $b_1$=1500000 [bps], $b_2$=900000 [bps], and $b_3$=800000 [bps].

At first, a process performed in S604 through S607 of a state where the variable i is 1 will be described. In S605, the replication data count calculation part 304 compares $b_1$ and g, and since $b_1 \geq g$, the replication data count calculation part 304 adds 1 to the replication data count $N_{int}$ (S606). Therefore, $N_{int}$ is set to 1.

Next, in a state where the variable i is 2, in S605, the replication data count calculation part 304 compares $b_2$ and g, and since $b_2$ is not greater than or equal to g, the replication data count calculation part 304 adds $b_2$ to the bundle circuit total transmission speed V (S607). Therefore, V is set to 900000.

Next, in a state where the variable i is 3, in S605, the replication data count calculation part 304 compares $b_3$ and g, and since $b_3$ is not greater than or equal to g, the replication data count calculation part 304 adds $b_3$ to the bundle circuit total transmission speed V, and therefore, V is 1700000.

In a state where the process up to S607 has been completed for all communication IFs, that is, in a state where i becomes equal to the communication IF count in S608, the replication data count calculation part 304 executes S610 next. In S610, V÷g (specifically, a value having rounded off the decimal part from the calculation result of 1700000÷1000000, that is, 1) is added to the replication data count $N_{int}$, and $N_{int}$ is set to 2. That is, V÷g represents the number of the replicated data to be transmitted using the bundle circuit (in this example, communication IF 2 and communication IF 3).

The mobile communication terminal 100 according to the present embodiment determines the replication data count by performing the process described above, such that the number of replicated data to be transmitted via the non-bundle circuit, that is, communication IF having a transmission speed equal to or greater than the data generation speed, is equal to the number of non-bundle circuits, and the number of replicated data to be transmitted via the bundle circuit becomes smaller than the number of bundle circuits. For example, in the example illustrated above, two IFs, the communication IF2 and the communication IF3, are bundle circuits, such that the number of replicated data to be transmitted via communication IF2 or communication IF3 is limited so as not to exceed 2.

If replicated data is transmitted using all bundle circuits, transmission of data will always be delayed, since the data quantity per unit time transmitted through the bundle circuits exceeds the total bandwidth of all bundle circuits. Further, the delay is increased as data is continued to be transmitted. The mobile communication terminal 100 according to the present embodiment determines the replication data count by the processing performed above, such that the amount of replicated data per unit time transmitted via the bundle circuits is limited so as not to exceed the bandwidth of all bundle circuits, and as a result, the delay regarding data transmission can be suppressed.

<Processing of Replicated Data Generation Part>

A replicated data generation processing of the replicated data generation part 305 will be described with reference to FIG. 8. In the following description, the replication data count computed by the replication data count calculation part 304 is denoted as $N_{int}$. As described earlier, in a state where the replication data count calculation part 304 computes a replication data count $N_{int}$, $N_{int}$ is entered to the replicated data generation part 305.

In S801, the replicated data generation part 305 prepares a variable $n_{int}$. The variable $n_{int}$ represents the number of replicated data to be generated by the replicated data generation part 305. Further, in S801, the replicated data generation part 305 initializes the replication data count $n_{int}$ by 1, and advances to S802.

In S802, the replicated data generation part 305 checks whether a replication data count $N_{int}$ has been received from the replication data count calculation part 304, advances to S803 if it has been received, and advances to S804 if it has not been received. In S803, the replicated data generation part 305 updates the value of $n_{int}$ to $N_{int}$ received from the replication data count calculation part 304, and advances to S804.

In S804, the replicated data generation part 305 checks whether data has been received from the application part 301, advances to S805 if it has been received, and advances to S802 if it has not been received. In S805, the replicated data generation part 305 generates the same number of replicated data as $n_{int}$, that is, replica of data received from the application part 301. Thereafter, the replicated data generation part 305 enters the relevant replicated data to the communication IF selection part 311, and returns to S802 again.

<Processing of Transmission Completion Time Calculation Part>

The processing of the transmission completion time calculation part 306 will be described with reference to FIG. 9. The transmission completion time calculation part 306 is executed at a timing in which data is generated and output by the application part 301, the data size is entered from the data size acquisition part 302, and the data generation speed of the application part 301 is entered from the data generation speed calculation part 303. Each time data is output from the application part 301, the transmission completion time calculation part 306 computes (estimates) a data transmission completion time of a case when the (replica of) data is transmitted via the communication IF 205, for each communication IF 205.

Figure 9:
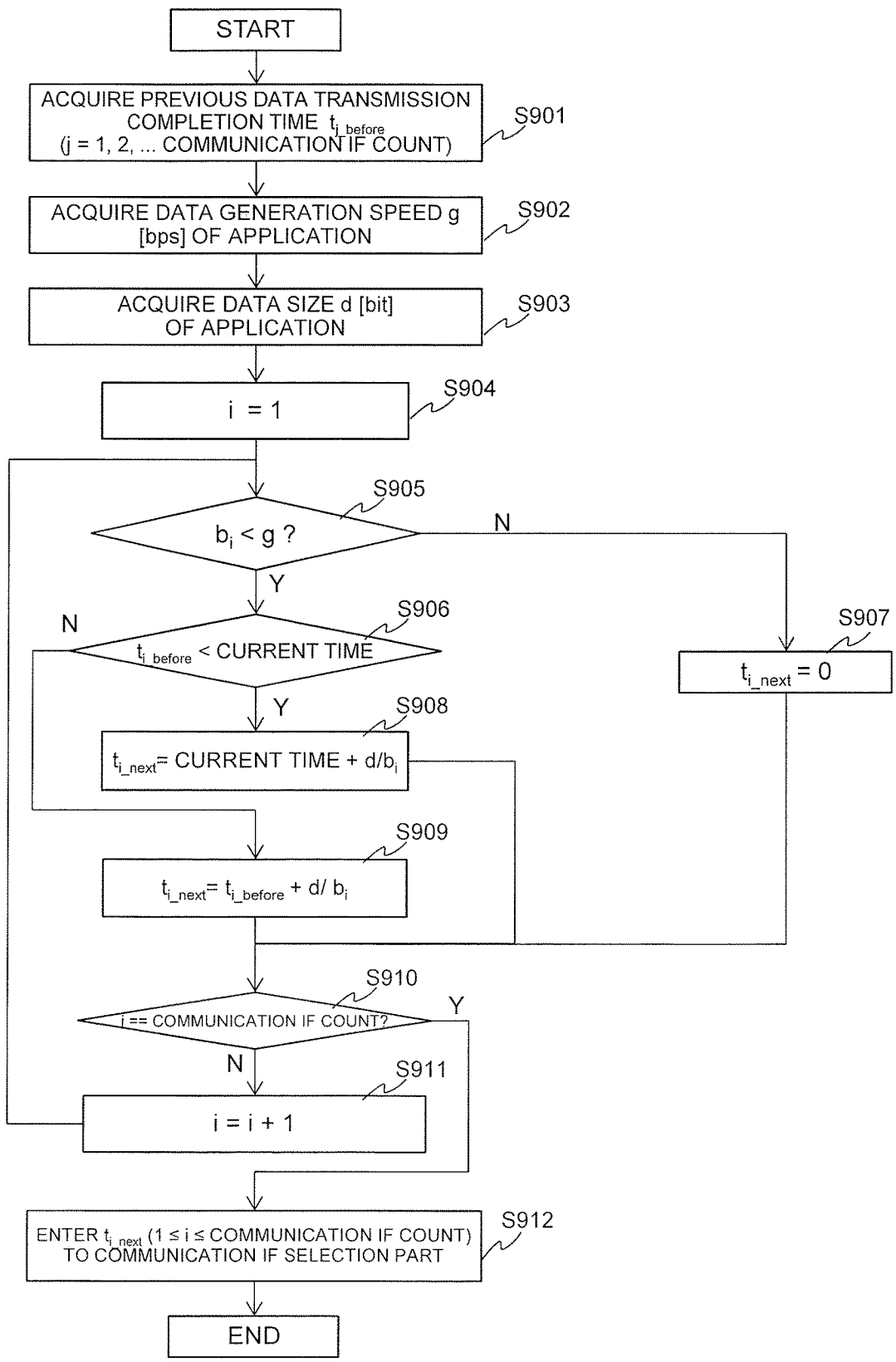
FIG. 9 is a processing flowchart of a transmission completion time calculation part.

In the following description, a time computed by the transmission completion time calculation part 306 through execution of the processing of FIG. 9 is called a "next data transmission completion time". Further, the transmission completion time calculation part 306 has a variable for retaining the next data transmission completion time. In the following description, the variable retaining the next data transmission completion time computed by the transmission completion time calculation part 306 for communication IFi (i is an integer of 1 or greater) is denoted as $t_{i\_next}$.

The expression of time used in the present embodiment, such as the expression of time information stored in variable $t_{i\_next}$, uses an elapsed time (seconds) from a certain reference time, such as from 0 o'clock 0 min 0 sec on Jan. 1, 2016. However, there is another meaning in a state where 0 is stored in the variable $t_{i\_next}$. The details will be described later.

In a state where the transmission completion time calculation part 306 computes the next data transmission completion time, the time (next data transmission completion time) which was computed the last time may be used. In the following description, a time (next data transmission completion time) computed by the transmission completion time calculation part 306 while executing the processing of FIG. 9 the last time is called a "previous data transmission completion time", and the previous data transmission completion time computed for communication IFi is denoted as $t_{i\_before}$. Further, the previous data transmission completion time $t_{i\_before}$ is stored in the transmission completion time storage part 310 by the communication IF selection part 311 described later.

In S901, the transmission completion time calculation part 306 acquires the previous data transmission completion time $t_{j\_before}$ (j=1, 2, ... m) of the respective communication IFs from the transmission completion time storage part 310, and advances to S902. In S902, the transmission completion time calculation part 306 acquires the data generation speed g [bps] of the application part 301 from the data generation speed calculation part 303, and advances to S903. In S903, the transmission completion time calculation part 306 acquires the data size d [bit] entered from the data size acquisition part 302, and advances to S904. In S904, the transmission completion time calculation part 306 prepares a variable i, initializes i by 1, and advances to S905.

In S905, the transmission completion time calculation part 306 compares $b_i$ and g, advances to S906 in a state where $b_i < g$, and advances to S907 if $b_i \geq g$. In S906, the transmission completion time calculation part 306 checks whether $t_{i\_before}$ is earlier than the current time, that is, whether "$t_{i\_before}$<current time" is satisfied. In a state where $t_{i\_before}$ is earlier than the current time, S908 is performed next, and in a state where $t_{i\_before}$ is not earlier than the current time, S909 is performed next.

In S907, the transmission completion time calculation part 306 stores 0 in $t_{i\_next}$, and advances to S910. When S907 is executed, the transmission speed of the communication IFi is faster than the data generation speed (since $b_i \geq g$), hence data transmission is completed before the data to be transmitted next from the application part 301 is passed to the communication IFi. In that case, the transmission completion time calculation part 306 sets $t_{i\_next}$ to 0.

In S908, the transmission completion time calculation part 306 substitutes (current time+d/$b_i$) in $t_{i\_next}$, and advances to S910. When S908 is executed, the data transmission processing performed the last time is already completed. This is because S908 is executed when "$t_{i\_before}$<current time" is satisfied, that is, in a state where the determination result of S906 is positive. Therefore, in this case, the transmission completion time calculation part 306 computes the next data transmission completion time by adding the time required to transfer size d [bit] data (that is, d/$b_i$) to the current time.

In S909, the transmission completion time calculation part 306 substitutes ($t_{i\_before}$+d/$b_i$) in $t_{i\_next}$, and advances to S910. When S909 is executed, the previous data transmission processing is not completed (since S909 is executed when $t_{i\_before} \geq$ current time), and the data transmission to be performed thereafter will be started after the previous data transmission processing is completed. Therefore, the next data transmission completion time is estimated to be ($t_{i\_before}$+d/$b_i$), and the transmission completion time calculation part 306 substitutes ($t_{i\_before}$+d/$b_i$) in $t_{i\_next}$.

In S910, the transmission completion time calculation part 306 checks whether "i==communication IF count", advances to S912 if i is equal to the communication IF count, and advances to S911 if not. In S911, 1 is added to i, and the procedure advances to S905. In S912, the next data transmission completion time $t_{j\_next}$ (j=1, 2, . . . m) of the respective communication IFs are entered to the communication IF selection part 311, and the process is ended.

<Processing of Communication IF Selection Part>

Figure 10:
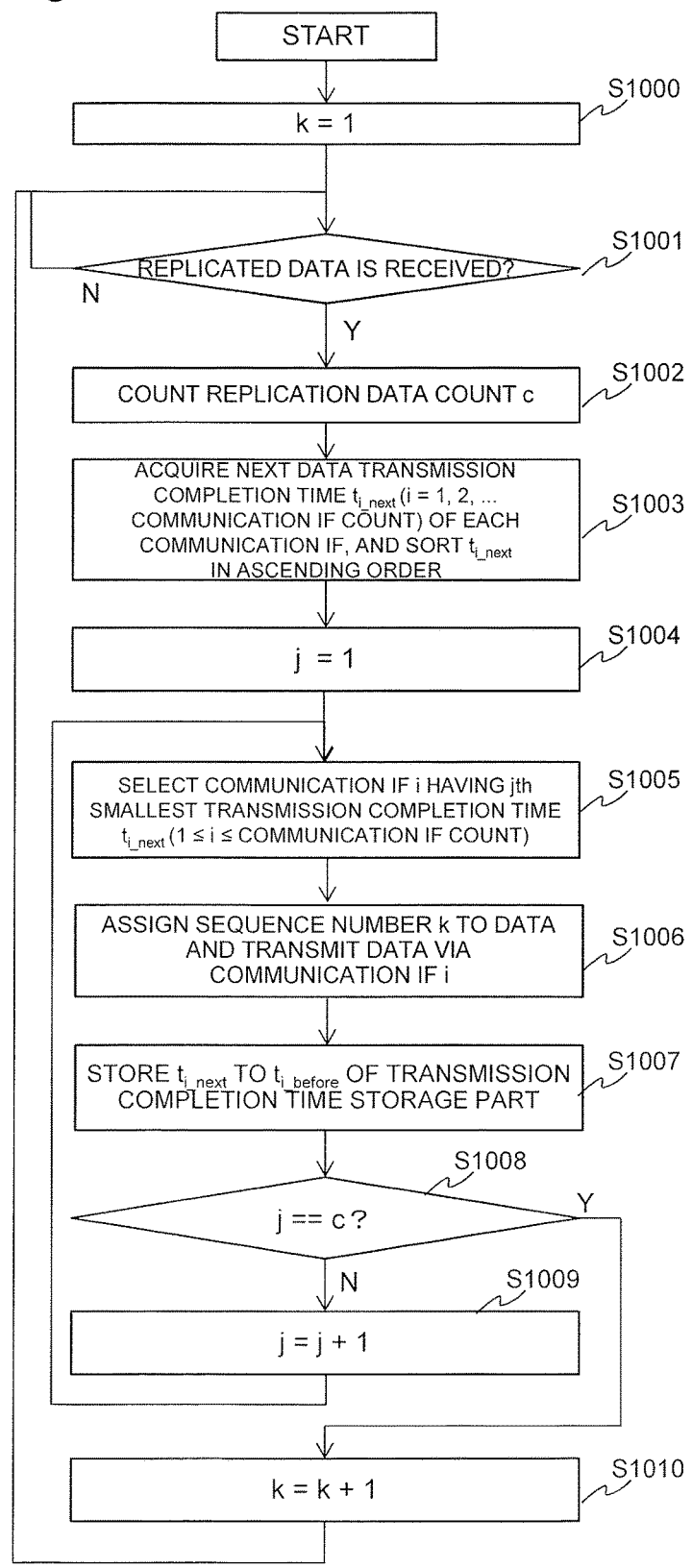
FIG. 10 is a processing flowchart of a communication IF selection part.

The processing of the communication IF selection part 311 will be described with reference to FIG. 10.

In S1000, the communication IF selection part 311 prepares a variable k, and k is initialized by 1. Thereafter, S1001 is performed.

In S1001, the communication IF selection part 311 checks whether the replicated data has been received from the replicated data generation part 305, advances to S1002 if it has been received, and advances to S1001 if not. In S1002, the communication IF selection part 311 counts the replication data count, and advances to S1003. In the following description, the replication data count being counted is referred to as c.

In S1003, the communication IF selection part 311 acquires the next data transmission completion time $t_{i\_next}$ (i=1, 2, . . . m) of the respective communication IFs from the transmission completion time calculation part 306, sorts the $t_{i\_next}$ in ascending order, and advances to S1004. In S1004, the communication IF selection part 311 prepares a variable j, initializes j by 1, and advances to S1005. In S1005, the communication IF selection part 311 compares the next data transmission completion time of the respective communication IFs, specifies the communication IF having the j-th smallest next data transmission completion time, and advances to S1006. In the following description, an example is illustrated of a case where the communication IF specified in S1005 is specified as communication IF i (wherein i is an integer of 1 or greater and m or smaller).

In S1006, the communication IF selection part 311 assigns a sequence number k to the replicated data, and instructs the communication IFi specified in S1005 to transmit the replicated data. Thereafter, the communication IF selection part 311 advances to S1007 without waiting for completion of data transmission of the communication IFi. In S1007, the communication IF selection part 311 updates the value of the previous data transmission completion time $t_{i\_before}$ stored in the transmission completion time storage part 310 to $t_{i\_next}$, and advances to S1008.

In S1008, the communication IF selection part 311 checks whether j==c, advances to S1010 if j==c, and advances to S1009 if not. In S1009, the communication IF selection part 311 adds 1 to j, and advances to S1005. In S1010, the communication IF selection part 311 adds 1 to k, and advances to S1001.

The communication IF selection part 311 does not necessarily have to execute the respective steps in the order described above. For example, the communication IF selection part 311 repeats selection of communication IF used for data transmission (S1005) and update processing of previous data transmission completion time $t_{i\_before}$ (S1007) for c number of times (the same number as the replication data count), and after they are completed, the selected respective communication IFs can execute data transmission (S1006) in parallel.

As another embodiment, the process for assigning a sequence number to the replicated data can be performed by other function parts, such as the replicated data generation part 305, instead of S1006 (the communication IF selection part 311).

<Format of Communication Data>

Figure 11:
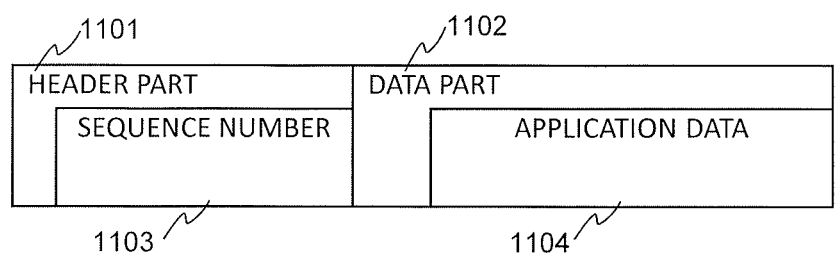
FIG. 11 is an example of a communication data format.

Now, a format of communication data that the communication IF selection part 311 transits via the communication IF 205 will be illustrated in FIG. 11. The communication data is composed of a header part 1101 and a data part 1102. The header part 1101 stores a sequence number 1103. The sequence number 1103 is assigned in S1006 of FIG. 10. The data part 1102 stores an application data 1104. The application data 1104 is data generated by the application part 301.

<Specific Example of Processing of Transmission Completion Time Calculation Part and Processing of Communication IF Selection Part>

A calculation example of data transmission completion time and an example of selection of communication IF will be described with reference to FIGS. 7, 12, 13, and 14. FIG. 7 illustrates a pre-condition for illustrating the example. As pre-condition, as illustrated in FIG. 7, the data generation speed g of the data generated by the application part 301 is set to 1000000 [bps], the data size d is set to 12000 [bit], and the data generation interval is set to 0.012 [s]. The number of communication IFs 205 is set to 3, and the transmission speed $b_1$, $b_2$, and $b_3$ of the respective communication IFs 205 determined in the transmission speed acquisition part 309 are respectively set to $b_1$=1500000 [bps], $b_2$=900000 [bps], and $b_3$=800000 [bps].

The following description illustrates an example in which a data having a data size of d=12000 [bit] is entered per data generation interval of 0.012 [s] starting from 0 [h]:0 [m]:1.000 [s] to the replicated data generation part 305. Further, it is assumed that there is no data whose transmission is not completed at time 0 [h]:0 [m]:1.000 [s]. The time in the following example is expressed as the elapsed time from 0 [h]:0 [m]:0.000 [s]. In other words, the values stored in $t_{i\_next}$ and $t_{i\_before}$ are the elapsed time from 0 [h]:0 [m]:0.000 [s]. However, in a state where 0 is stored in $t_{i\_next}$, it does not mean that $t_{i\_next}$ (next data transmission completion time) is 0 [h]:0 [m]:0.000 [s]. In this case, as described earlier, it means that the previous data transmission processing has been completed.

The calculation result of the replication data count according to the present pre-condition is two, as described in the <specific example of processing flow of calculation of replication data count>.

FIG. 12 illustrates a calculation example of data transmission completion time.

Reference numbers 1210, 1220, 1230, and 1240 respectively denote calculation results of the next data transmission completion time computed by the transmission completion time calculation part 306 at 0 [h]:0 [m]:1.000 [s], 0:0:1.012, 0:0:1.024, and 0:0:1.036. For example, column 1214 shows the next data transmission completion time computed by the transmission completion time calculation part 306 at 0:0:1.000, and column 1213 shows the time (previous data transmission completion time) stored in the transmission completion time storage part 310 at that point of time. Further, among the values stored in column 1214 (or columns 1224, 1234, and 1244), the underlined values represent the next data transmission completion time of the communication IF that the communication IF selection part 311 has selected among the bundle circuits for transmitting the replicated data.

Figure 13:
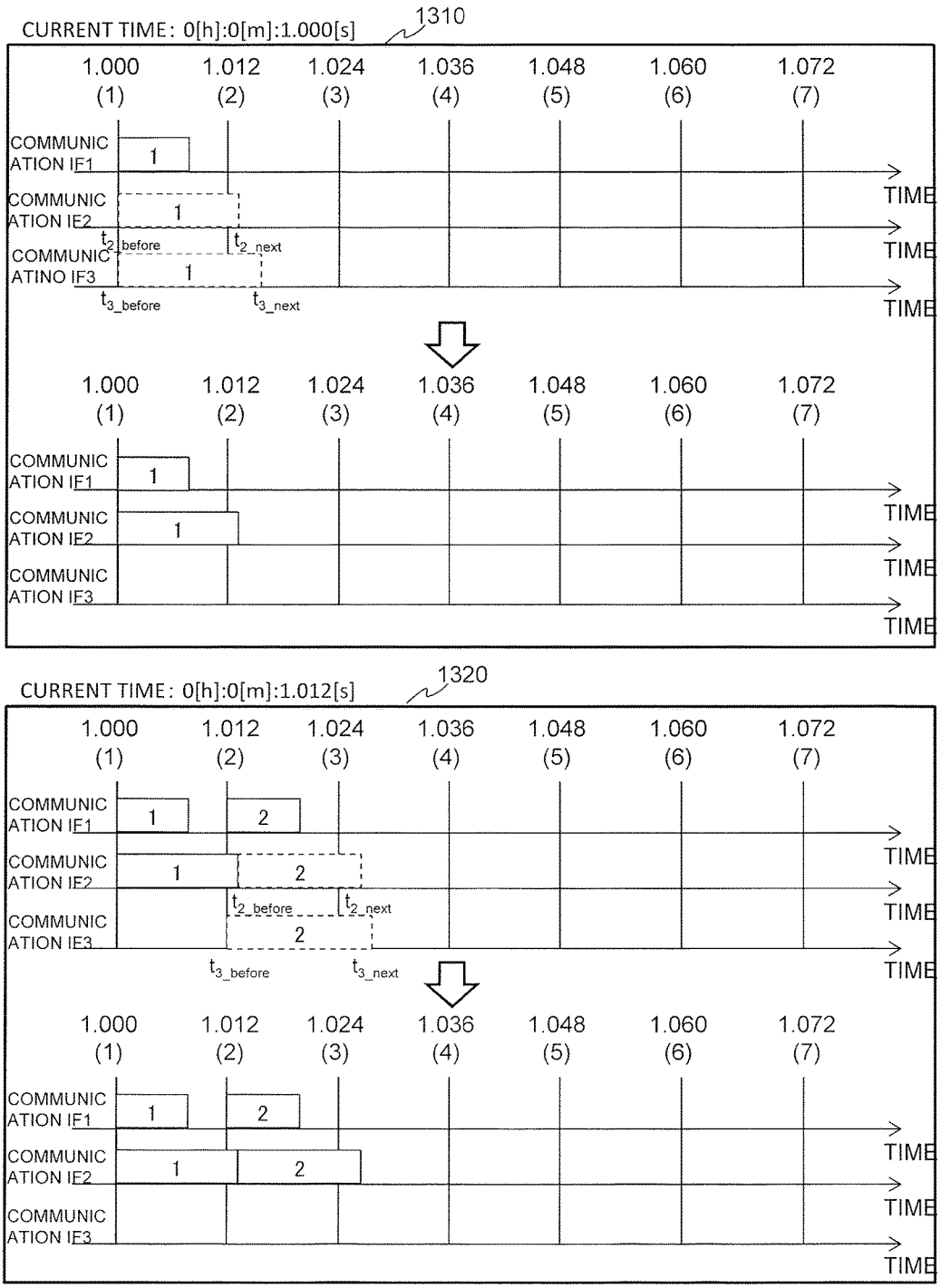
FIG. 13 is a view illustrating an example of selection of communication IFs.

FIGS. 13 and 14 illustrate the result of having the communication IF selection part 311 select a communication IF 205 for transmitting the replicated data and transmit the same based on the next data transmission completion time. Reference numbers 1310, 1320, 1410, and 1420 respectively indicate the result of having transmitted the replicated data supplied at 0:0:1.000, 0:0:1.012, 0:0:1.024, and 0:0:1.036.

The processing performed by the transmission completion time calculation part 306 in a state where the current time is 0 [h]:0 [m]:1.000 [s] will be described (1210). The transmission completion time calculation part 306 executes S905 through S909 for communication IF 1, communication IF 2, and communication IF 3.

As for $b_1$, since $b_1$<g is not satisfied (S905), the transmission completion time calculation part 306 sets the next data transmission completion time $t_{1\_next}$ to 0 (S907).

As for $b_2$, since $b_2$<g is satisfied (S905) and $t_{2\_before}$ is smaller than the current time (0:0:1.000), the transmission completion time calculation part 306 executes S908. Thereby, the next data transmission completion time $t_{2\_next}$ is set to 1.000+12000/900000=1.0133.

As for $b_3$, since $b_3$<g is satisfied (S905) and $t_{3\_before}$ is smaller than the current time, the transmission completion time calculation part 306 executes S908. Thereby, the next data transmission completion time $t_{3\_next}$ is set to 1.000+12000/600000=1.020.

Next, we will describe the processing of the communication IF selection part 311 executed after the processing of the transmission completion time calculation part 306.

Since two replicated data are transmitted from the replicated data generation part 305, the replication data count c is determined as 2 (S1002). Since the replication data count c is 2, the process for selecting the communication IFs and sending data using the selected communication IFs (S1005 through S1007) is executed twice by the communication IF selection part 311.

At first, in S1003, the communication IF selection part 311 acquires the next data transmission completion time $t_{i\_next}$ (i=1, 2, 3) of the respective communication IFs from the transmission completion time calculation part 306, and sorts the $t_{i\_next}$ in ascending order. As a result, they are sorted in the order of $t_{1\_next}$, $t_{2\_next}$, and $t_{3\_next}$.

In a state where S1005 is performed for the first time, the communication IF selection part 311 selects the communication IF having the smallest transmission completion time $t_{i\_next}$ (i=1, 2, 3) (communication IF 1). Next, the communication IF selection part 311 updates $t_{1\_before}$ of the transmission completion time storage part 310 to $t_{1\_next}$ (=0) (S1007).

In a state where S1005 is performed for the second time, communication IF 2 having the second smallest transmission completion time $t_{i\_next}$ (i=1, 2, 3) is selected. In S1007, $t_{2\_before}$ of the transmission completion time storage part 310 is updated to $t_{2\_next}$ (=1.0133).

The chart illustrated on the upper row of 1310 of FIG. 13 indicates the next data transmission completion time of each communication IF calculated by the above-described steps, and the chart illustrated on the lower row indicates the result of transmitting data to the communication IF (communication IF 1 and communication IF 2) that the communication IF selection part 311 selects based on the next data transmission completion time.

The processing performed by the transmission completion time calculation part in a state where the current time is 0 [h]:0 [m]:1.012 [s] will be described (1220).

As for $b_1$, since $b_1$<g is not satisfied (S905), the transmission completion time calculation part 306 sets the next data transmission completion time $t_{1\_next}$ to 0 (S907).

As for $b_2$, since $b_2$<g is satisfied (S905) and $t_{2\_before}$ is greater than the current time (0:0:1.012), the transmission completion time calculation part 306 sets the next data transmission completion time $t_{2\_next}$ to 1.013+12000/900000=1.0266 (S909).

As for $b_3$, since $b_3$<g is satisfied (S905) and $t_{3\_before}$ is smaller than the current time, the transmission completion time calculation part 306 sets the next data transmission completion time $t_{3\_next}$ to 1.012+12000/800000=1.027 (S908).

Next, we will describe the processing of the communication IF selection part 311 executed after the processing of the transmission completion time calculation part 306.

Similar to the aforementioned example, the replication data count c is 2 (S1002).

The communication IF selection part 311 acquires the next data transmission completion time $t_{i\_next}$ (i=1, 2, 3) of the respective communication IFs from the transmission completion time calculation part 306, and sorts the $t_{i\_next}$ in ascending order. As a result, they are sorted in the order of $t_{1\_next}$, $t_{2\_next}$, and $t_{3\_next}$ (S1003).

In a state where S1005 is performed for the first time, the communication IF selection part 311 selects the communication IF 1 having the smallest transmission completion time $t_{i\_next}$ (i=1, 2, 3). Next, the communication IF selection part 311 updates $t_{1\_before}$ of the transmission completion time storage part 310 to $t_{1\_next}$ (=0).

In a state where S1005 is performed for the second time, communication IF 2 having the second smallest transmission completion time $t_{i\_next}$ (i=1, 2, 3) is selected (S1005), and $t_{2\_before}$ of the transmission completion time storage part 310 is updated to $t_{2\_next}$ (=1.0266) (S1007).

The chart illustrated on the upper row of 1320 of FIG. 13 indicates the next data transmission completion time of each communication IF calculated in the above-described steps, and the chart illustrated on the lower row indicates the result of transmitting data to the communication IF (communication IF 1 and communication IF 2) that the communication IF selection part 311 selects based on the next data transmission completion time.

The processing performed by the transmission completion time calculation part 306 in a state where the current time is 0 [h]:0 [m]:1.024 [s] will be described (1220).

As for $b_1$, since $b_1 < g$ is not satisfied (S905), the next data transmission completion time $t_{1\_next}$ is set to 0 (S907).

As for $b_2$, since $b_2 < g$ is satisfied (S905) and $t_{2\_before}$ is greater than the current time (0:0:1.024), the transmission completion time calculation part 306 sets the next data transmission completion time $t_{2\_next}$ to 1.0266+12000/900000=1.0399 (S909).

As for $b_3$, since $b_3 < g$ is satisfied (S905) and $t_{3\_before}$ is smaller than the current time, the transmission completion time calculation part 306 sets the next data transmission completion time $t_{3\_next}$ to 1.024+12000/800000=1.039 (S908).

Next, we will describe the processing of the communication IF selection part 311.

Similar to the aforementioned example, the replication data count c is 2 (S1002).

The communication IF selection part 311 acquires the next data transmission completion time $t_{i\_next}$ (i=1, 2, 3) of the respective communication IFs from the transmission completion time calculation part 306, and sorts the $t_{i\_next}$ in ascending order, such that they are sorted in the order of $t_{1\_next}$, $t_{3\_next}$, and $t_{2\_next}$ (S1003).

In S1005, the communication IF selection part 311 selects the communication IF 1 having the smallest transmission completion time $t_{i\_next}$ (i=1, 2, 3). Next, the communication IF selection part 311 updates $t_{i\_before}$ of the transmission completion time storage part 310 to $t_{i\_next}$ (=0) (S1007).

In a state where S1005 is performed next, communication IF 3 having the second smallest transmission completion time $t_{i\_next}$ (i=1, 2, 3) is selected, and $t_{i\_before}$ Of the transmission completion time storage part 310 is updated to $t_{3\_next}$ (=1.039) (S1007).

The chart illustrated on the upper row of 1410 of FIG. 14 shows the next data transmission completion time of each communication IF calculated in the above-described steps, and the chart illustrated on the lower row indicates the result of transmitting data to the communication IF (communication IF 1 and communication IF 3) selected by the communication IF selection part 311 based on the next data transmission completion time.

The processing performed by the transmission completion time calculation part in a state where the current time is 0 [h]:0 [m]:1.036 [s] will be described (1220).

As for $b_1$, since $b_1 < g$ is not satisfied (S905), the transmission completion time calculation part 306 sets the next data transmission completion time $t_{1\_next}$ to 0 (S907).

As for $b_2$, since $b_2 < g$ is satisfied (S905) and $t_{2\_before}$ is smaller than the current time (0:0:1.036), the transmission completion time calculation part 306 sets the next data transmission completion time $t_{2\_next}$ to 1.036+12000/900000=1.0499 (S908).

As for $b_3$, since $b_3 < g$ is satisfied (S905) and $t_{3\_before}$ is greater than the current time (0:0:1.036), the transmission completion time calculation part 306 sets the next data transmission completion time $t_{3\_next}$ to 1.039+12000/800000=1.054 (S909).

Next, we will describe the processing of the communication IF selection part 311.

Similar to the aforementioned example, the replication data count c is 2 (S1002).

The communication IF selection part 311 acquires the next data transmission completion time $t_{i\_next}$ (i=1, 2, 3) of the respective communication IFs from the transmission completion time calculation part, and sorts the $t_{i\_next}$ in ascending order. As a result, they are sorted in the order of $t_{1\_next}$, $t_{2\_next}$, and $t_{3\_next}$ (S1003).

In S1005, the communication IF selection part 311 selects the communication IF 1 having the smallest transmission completion time $t_{i\_next}$ (i=1, 2, 3). In S1007, the communication IF selection part 311 updates $t_{i\_before}$ of the transmission completion time storage part 310 to $t_{i\_next}$ (=0) (S1007).

In a state where S1005 is performed for the second time, the communication IF selection part 311 selects communication IF 2 having the second smallest transmission completion time $t_{i\_next}$ (i=1, 2, 3), and updates $t_{i\_before}$ of the transmission completion time storage part 310 to $t_{2\_next}$ (=1.0499) (S1007).

The chart illustrated on the upper row of 1420 of FIG. 14 indicates the next data transmission completion time of each communication IF calculated in the above-described steps, and the chart illustrated on the lower row indicates the result of transmitting data to the communication IF that the communication IF selection part 311 selects based on the next data transmission completion time.

As described with reference to FIGS. 9 and 10, the mobile communication terminal 100 of the present embodiment computes (estimates) the data transmission completion time (the aforementioned "next data transmission completion time") in a case when data transmission is performed from the respective communication IFs, and based on the computed data transmission completion time of the respective communication IFs, selects the communication IFs to be used for data transmission. Specifically, the communication IF having the earliest data transmission completion time is selected with priority. Thereby, data communication delay can be suppressed to a minimum.

Figure 15:
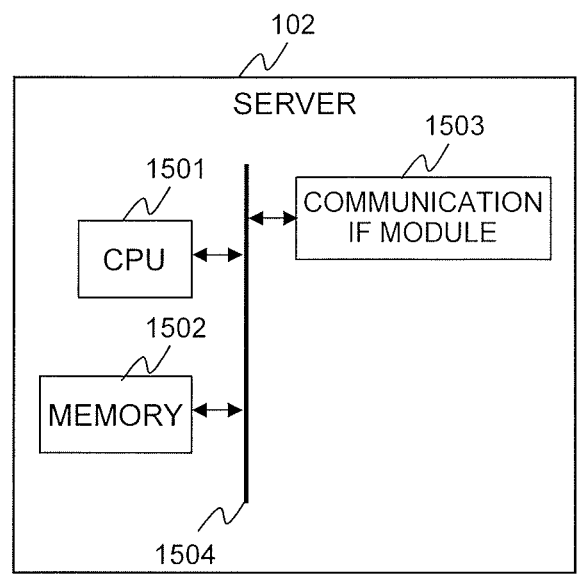
FIG. 15 is a physical configuration diagram of a server.

Lastly, we will describe the configuration of the server 102 in the communication system according to the present embodiment. FIG. 15 is a physical configuration diagram of the server 102. The server 102 is composed of a CPU 1501, a memory 1502, a communication IF module 1503 (hereinafter abbreviated as "communication IF 1503"), and a bus 1504 connecting the components.

Figure 16:
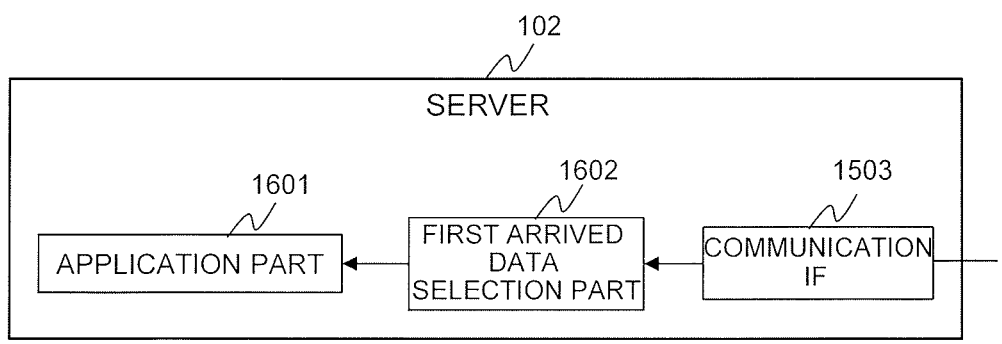
FIG. 16 is a functional block diagram of the server.

FIG. 16 is a functional block diagram of the server 102.

The server 102 is configured of an application part 1601, a first arrived data selection part 1602, and a communication IF 1603. The application part 1601 and the first arrived data selection part 1602 are function parts which are realized by the CPU 1501 executing programs stored in the memory 1502.

The application part 1601 utilizes the data transmitted from the mobile communication terminal 100, and executes various processes such as analysis.

The first arrived data selection part 1602 is a function part in which the data received via the communication IF 1503 is passed to the application part 1601. As described earlier, a plurality of replicated data to which are assigned the same sequence number are transmitted form the mobile communication terminal 100 to the server 102. The first arrived data selection part 1602 checks the sequence number of the received communication data, and if the data having that sequence number is received for the first time, the data is entered to the application part 1601. If the data having the same sequence number is received for the second time or later, the first arrived data selection part 1602 discards that data. Since such processing is performed by the first arrived data selection part 1602, the application part 1601 only receives the first arrived data among the plurality of replicated data having the same sequence number assigned.

According to the communication system of the present embodiment, a low-delay, high-quality communication can be realized even in a state where a transmission speed of a certain communication carrier is exceeded.

Second Embodiment

Next, a communication system according to a second embodiment will be described. In the first embodiment, the replication data count output from the replication data count calculation part 304 was an integer (with the decimal part rounded off). The second embodiment describes a method for increasing the replication data count and minimizing delay, by allowing the replication data count to be of values not restricted to an integer.

The mobile communication terminal 100 according to the second embodiment differs from the first embodiment in the method for calculating the replication data count of the replication data count calculation part 304 and the method for generating the replicated data of the replicated data generation part 305.

<Processing of Replication Data Count Calculation Part>

Figure 17:
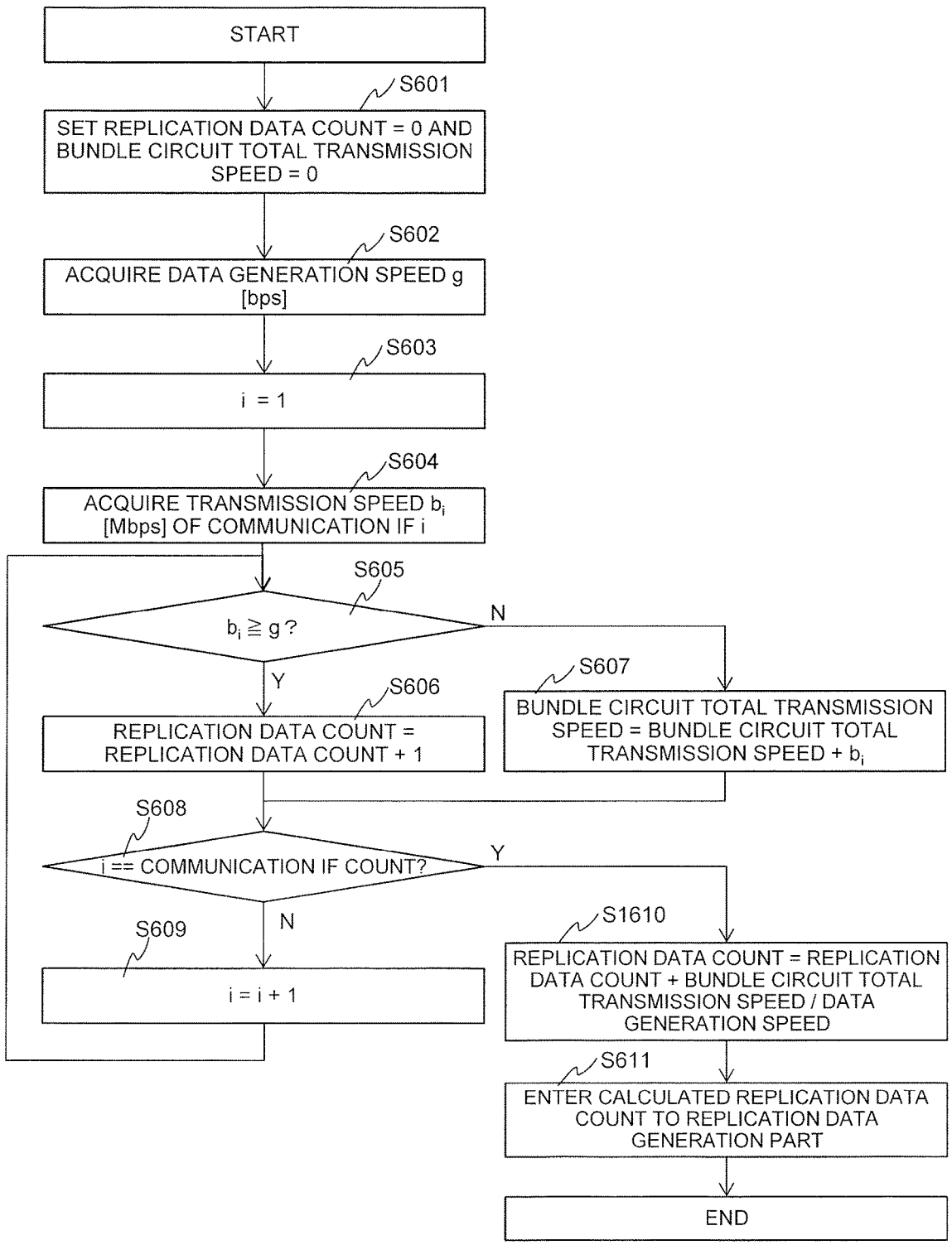
FIG. 17 is a processing flowchart of a replication data count calculation part of a mobile communication terminal according to a second embodiment.

The method for calculating the replication data count by the replication data count calculation part 304 will be described with reference to FIG. 17. Only the portion that differs from FIG. 6 of the first embodiment will be described. The processing of the replication data count calculation part 304 performed in the second embodiment is the same as the processing described in the first embodiment, other than the S610 described in the first embodiment being replaced with S1610.

In S1610, the replication data count is updated by (replication data count+bundle circuit total transmission speed/ data generation speed). Further, "bundle circuit total transmission speed/data generation speed" refers to a value having divided the bundle circuit total transmission speed by the data generation speed, and this value includes decimal parts.

<Specific Example of Processing of Replication Data Count Calculation Part>

A specific example of the method for calculating the replication data count by the replication data count calculation part 304 according to the second embodiment will be described with reference to FIG. 17. The data generation speed g of the application part 301 and the transmission speed $b_i$ ($1 \leq i \leq 3$) of the respective communication IFs 205 determined by the transmission speed acquisition part 309 are assumed to be set to conditions illustrated in FIG. 7. That is, the data generation speed g of the application part 301 is set to 1000000 [bps], the transmission speed $b_1$ is set to 1500000 [bps], $b_2$ is set to 900000 [bps], and $b_3$ is set to 800000 [bps]. In the following description, the replication data count computed by the replication data count calculation part 304 in the second embodiment is denoted as $N_{dec}$.

In a state where the replication data count calculation part 304 executes S604 through S607 for the first time, since $b_1$ satisfies the relationship of $b_1 \geq g$, 1 is added to the replication data count $N_{dec}$, and the replication data count $N_{int}$ is set to 1 (S604, 605 and 606). In a state where the replication data count calculation part 304 executes S604 through S607 for the second time, $b_2$ does not satisfy the relationship of $b_2 \geq g$, such that $b_2$ is added to the bundle circuit total transmission speed V, and the bundle circuit total transmission speed V is set to 0.9 [Mbps] (S604, 605, and 607).

In a state where S604 through S607 are executed by the replication data count calculation part 304 for the third time, since $b_3$ does not satisfy the relationship of $b_3 \geq g$, $b_3$ is added to the bundle circuit total transmission speed V. As a result, the bundle circuit total transmission speed V is set to 1.5 [Mbps] (S604, 605, 607).

Thereafter, the replication data count calculation part 304 executes S1610. As a result of S1610, the replication data count $N_{dec}$ is set to 1+(1.7/1.0)=2.7.

<Processing of Replicated Data Generation Part>

Figure 18:
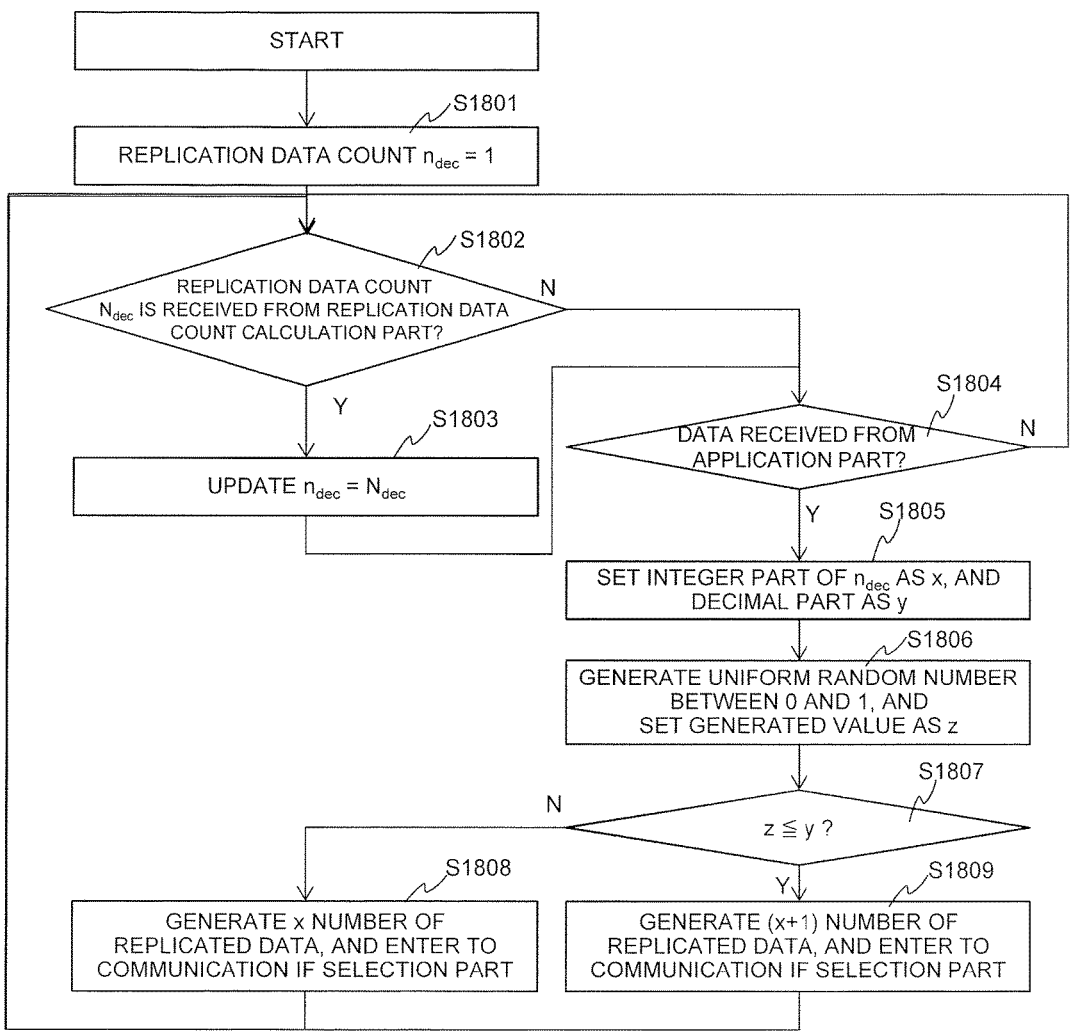
FIG. 18 is a processing flowchart of a replicated data generation part of the mobile communication terminal according to the second embodiment.

The replicated data generation processing of the replicated data generation part 305 according to the second embodiment will be described with reference to FIG. 18.

In S1801, the replicated data generation part 305 prepares a variable $n_{dec}$. The variable $n_{dec}$ represents the number of replicated data to be generated by the replicated data generation part 305. In S1801, the replicated data generation part 305 initializes the replication data count $n_{dec}$ by 1, and advances to S1802.

In S1802, the replicated data generation part 305 checks whether the replication data count $N_{dec}$ has been received from the replication data count calculation part 304, advances to S1803 if it has been received, and advances to S1804 if not. In S1803, the replicated data generation part 305 updates $n_{dec}$ to $N_{dec}$, and advances to S1804.

In S1804, the replicated data generation part 305 checks whether data has been received from the application part 301, advances to S1805 if data has been received, and advances to S1802 if it has not been received. In S1805, the replicated data generation part 305 substitutes the integer part of $n_{dec}$ to variable x, substitutes the decimal part to variable y, and advances to S1806. In S1806, the replicated data generation part 305 generates a uniform random number between 0 and 1, and advances to S1807. In the following description, the value generated in S1806 is denoted as z. Since the value generated here is a uniform random number between 0 and 1, every time S1806 is executed, a real number from 0 to 1 is generated with the same probability.

In S1807, the replicated data generation part 305 checks whether $z \leq y$ is satisfied, advances to S1809 if it is satisfied, and advances to S1808 if it is not satisfied. In S1808, the replicated data generation part 305 generates x number of replicated data (replica of data received from the application part 301), enters the same to the communication IF selection part 311, and advances to S1802. Meanwhile, in a state where S1809 is executed, the replicated data generation part 305 generates (x+1) number of replicated data in S1809, enters the same to the communication IF selection part 311, and advances to S1802.

According to the above processing, even in a state where the replication data count includes a decimal fraction, an expected value (mean) of the number of the replicated data which are actually generated can correspond to $n_{dec}$.

<Specific Example of Processing of Replicated Data Generation Part>

In the example of FIG. 7, as described in the <specific example of processing of replication data count calculation part>, the replication data count $n_{dec}$ computed by the replication data count calculation part 304 becomes 2.7. Further, in a state where the replicated data generation part 305 is executed, the integer part x of $n_{dec}$ is determined as 2, and the decimal part y is determined as 0.7 (S1805). If the value generated in S1806 using the uniform random number between 0 and 1 is 0.3, the replicated data generation part 305 generates (2+1) number of replicated data, and enters the same to the communication IF selection part 311 (S1809).

Similar to the <specific example of processing of transmission completion time calculation part and processing of communication IF selection part> of the first embodiment, the specific example of the transmission processing of the second embodiment will be described with reference to the example of FIG. 7.

As illustrated in FIG. 7, regarding the data generated by the application part 301, the data generation speed g is set to 1000000 [bps], the data size d is set to 12000 [bit], and the data generation interval is set to 0.012 [s], and the transmission speed $b_1$ is set to 1500000 [bps], the transmission speed $b_2$ is set to 900000 [bps], and the transmission speed $b_3$ is set to 600000 [bps].

Now, in the generation processing of the uniform random number between 0 and 1 performed in S1806, it is assumed that 0.3 is generated at time 0 [h]:0 [m]:1.000 [s], 0.8 at time 0:0:1.012, 0.6 at time 0:0:1.024, and 0.9 at time 0:0:1.036. In that case, three replicated data are generated at time 0:0:1.000 and 0:0:1.024 (S1809), and two replicated data are generated at time 0:0:1.012 and 0:0:1.036 (S1808).

Figure 20:
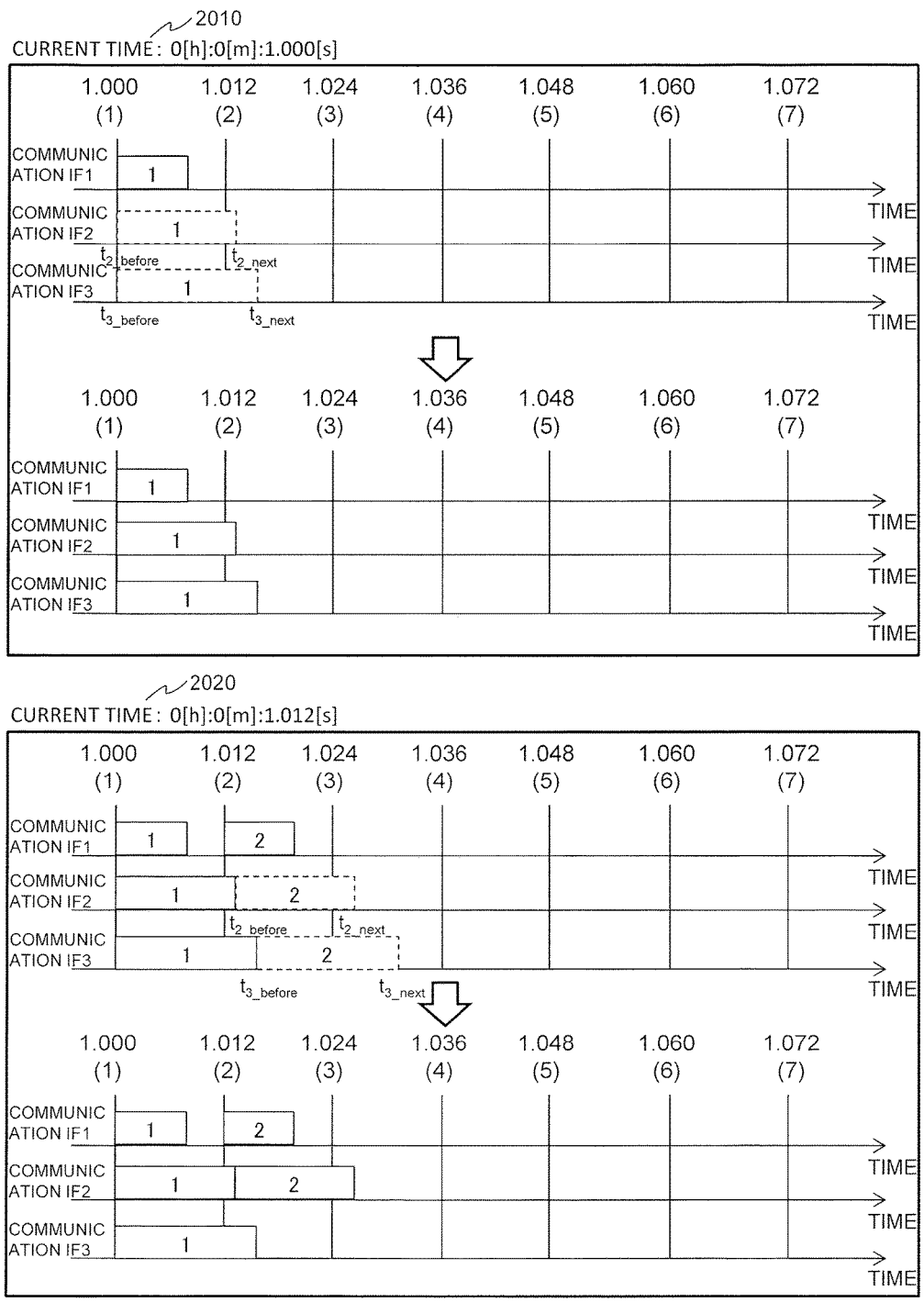
FIG. 20 is an example of selection of communication IFs according to the second embodiment.

The calculation result of the next data transmission completion time at each of the times 0:0:1.000, 0:0:1.012, 0:0:1.024, and 0:0:1.036 are respectively shown in 1910, 1920, 1930, and 1940 of FIG. 19. Further, the result of actually transmitting data to each communication IF at 0:0:1.000, 0:0:1.012, 0:0:1.024, and 0:0:1.036 are respectively shown in 2010 and 2020 of FIGS. 20 and 2110 and 2120 of FIG. 21.

According to the communication system of the second embodiment, even in a state where the transmission speed of a certain communication carrier has been exceeded, replicated data greater than the communication system of the first embodiment can be transmitted, and low delay communication can be realized.

Third Embodiment

In a third embodiment, a method is described for minimizing delay, even in a case where the mobile communication terminal 100 cannot accurately recognize the transmission speed.

Figure 22:
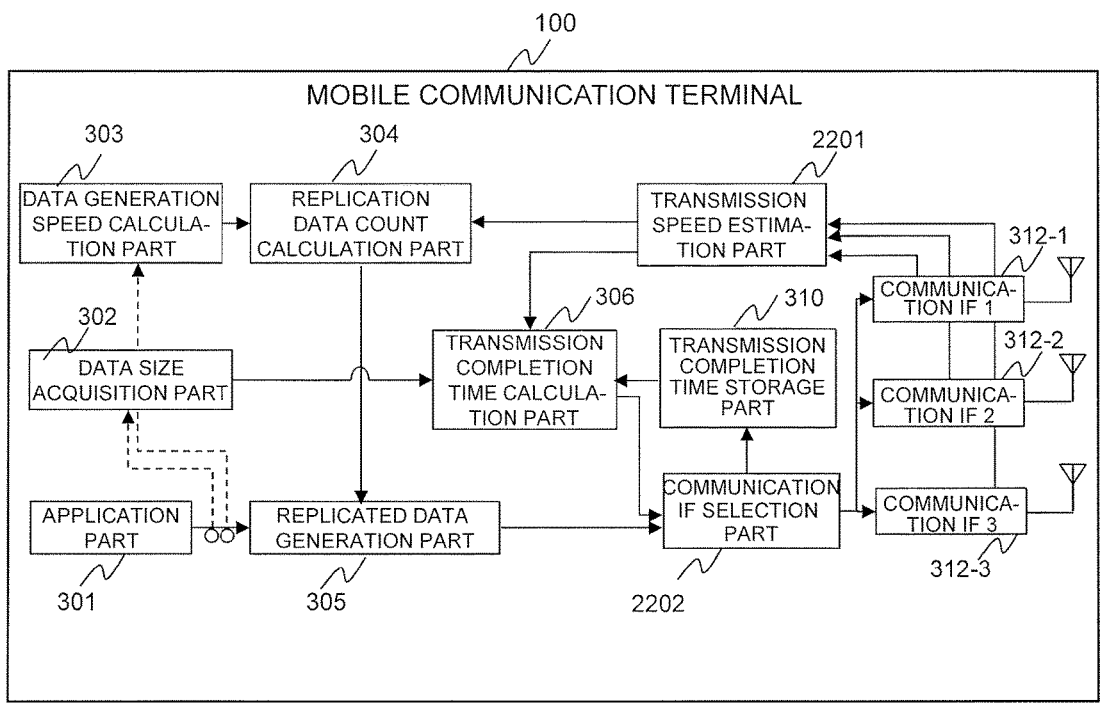
FIG. 22 is a functional block diagram of a mobile communication terminal according to a third embodiment.

FIG. 22 illustrates a functional block diagram of the mobile communication terminal 100 according to the third embodiment. Only the functions that differ from FIG. 3 will be described here.

The mobile communication terminal 100 according to the third embodiment has a transmission speed estimation part 2201 instead of the transmission speed acquisition part 309 according to the first embodiment. The mobile communication terminal 100 according to the third embodiment is not required to have the communication quality table 307. The transmission speed estimation part 2201 estimates the transmission speed based on the communication quality information received from the server 102 via the communication IF 205. The communication quality information will be described in detail later. The transmission speed estimation part 2201 enters the above-described estimated transmission speed to the replication data count calculation part 304 and the transmission completion time calculation part 306.

A communication IF selection part 2202 not only performs a similar processing as the communication IF selection part 311 of FIG. 3, but also additionally performs the following processing. The communication IF selection part 2202 selects the communication IF 205 transmitting one or a plurality of data entered from the replicated data generation part 305, and assigns the same sequence number to the one or a plurality of data. Further, the communication IF selection part 2202 assigns an identifier of the communication IF 205 used to transmit the replicated data (referred to as communication IF number, or communication path identifier) and the current time to the respective replicated data, and transmits the data through the communication IF 205. Even the same replicated data (replicated data assigned with the same sequence number) are transmitted via different communication IFs, such that a different communication path identifier is assigned to each replicated data.

Figure 23:
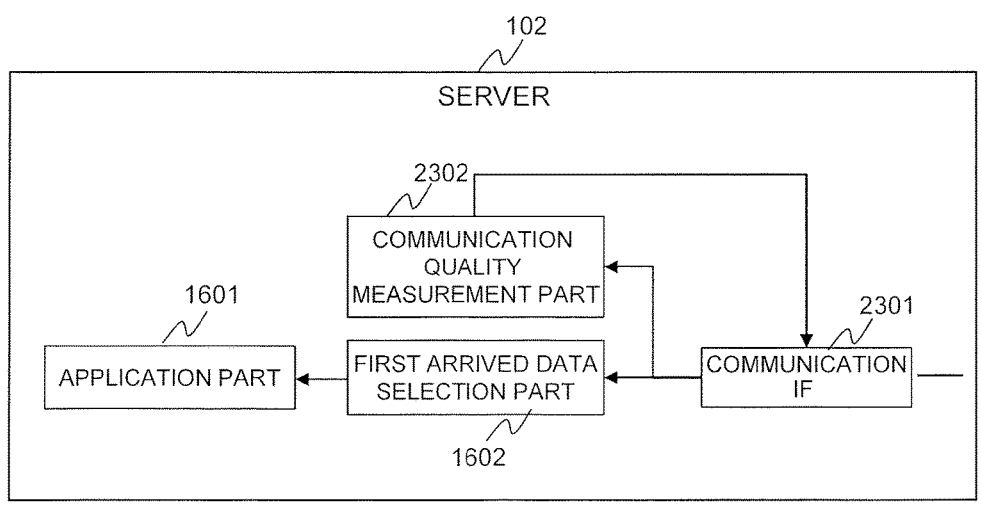
FIG. 23 is a functional block diagram of a server according to the third embodiment.

FIG. 23 illustrates a functional block diagram of the server 102 according to the third embodiment. Only the function parts (communication IF 2301 and communication quality measurement part 2302) that differ from FIG. 16 are described. The communication IF 2301 and the communication quality measurement part 2302 are function parts realized by the CPU 1501 reading the programs stored in the memory 1502 and executing the programs using the memory 1502 and the communication IF module 1503.

The communication IF 2301 enters the data received from the mobile communication terminal 100 to the first arrived data selection part 1602 and the communication quality measurement part 2302. The communication quality measurement part 2302 refers to the information stored in a header portion of the data being entered to generate a communication quality information, and transmits the generated communication quality information via the communication IF 2301 to the mobile communication terminal 100.

Figure 24:
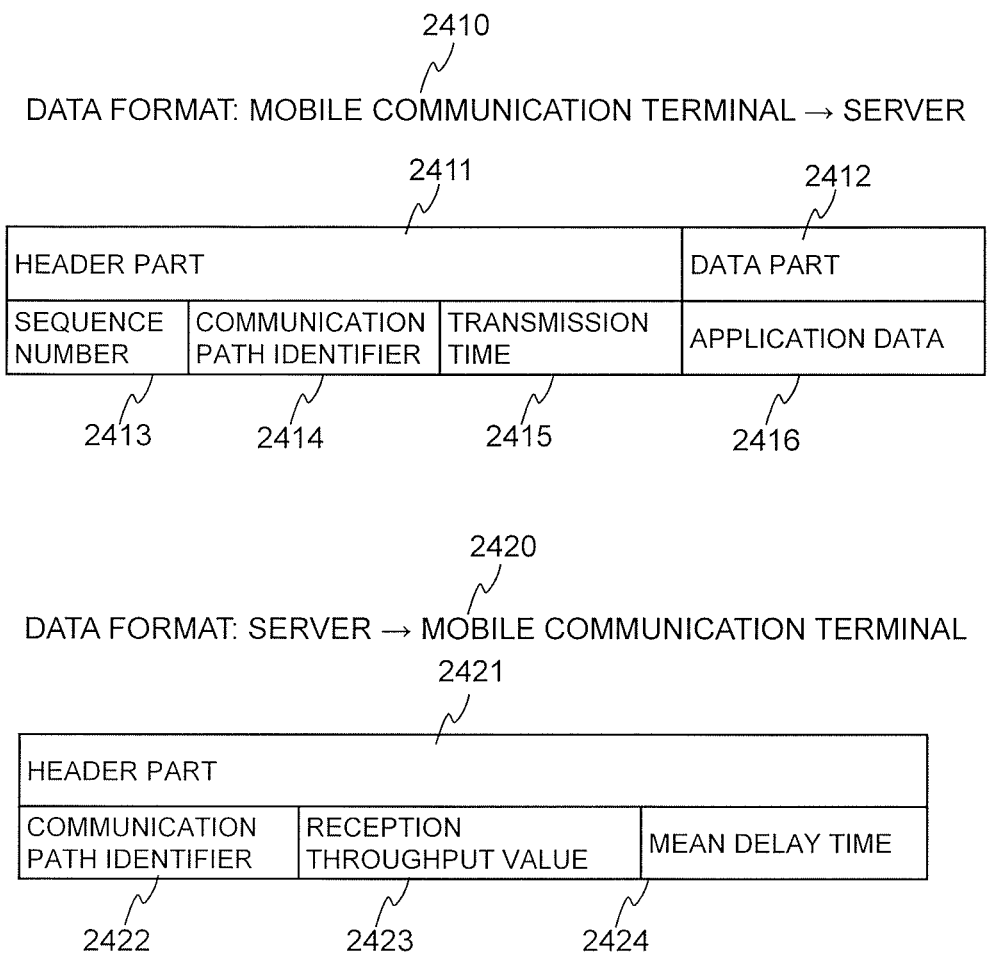
FIG. 24 is an example of a communication data format according to the third embodiment.

FIG. 24 illustrates in 2410 a format of the data that the mobile communication terminal 100 transmits to the server 102. Similar to the first embodiment, data 2410 that the mobile communication terminal 100 transmits to the server 102 includes a header part 2411 and a data part 2412. However, the header part 2411 of the data that the mobile communication terminal 100 generates according to the third embodiment includes a communication path identifier 2414 and a transmission time 2415, in addition to a sequence number 2413. The data part 2412 includes an application data 2416. The application data 2416 is data generated by the application part 301. The communication path identifier 2414 is an identifier for identifying the communication IF 205 transmitting the present data. In the present embodiment, a communication path formed between the mobile communication terminal 100 and the server 102 by the communication IF i (i is an integer of 1 or greater) is referred to as a "communication path i". For example, a communication path 1 is a path starting from communication IF 1 and reaching the server 102 via a base station 1 (110-1) and a carrier network (120-1). The number of communication paths (communication path count) provided between the mobile communication terminal 100 and the server 102 is equivalent to the number of communication IFs 205 included in the mobile communication terminal 100.

FIG. 24 shows in 2420 the format of the data that the server 102 transmits to the mobile communication terminal 100 in 2420. A data 2420 that the server 102 transmits to the mobile communication terminal 100 only includes a header part 2421. The header part 2421 includes a communication path identifier 2422, a reception throughput value 2423 showing a mean data transfer speed of the communication path, and a mean delay time 2424 of transmitting data from the mobile communication terminal 100 to the server 102. In the present embodiment, 2420 is referred to as "communication quality information".

<Processing of Communication Quality Measurement Part 2302 of Server>

Figure 25:
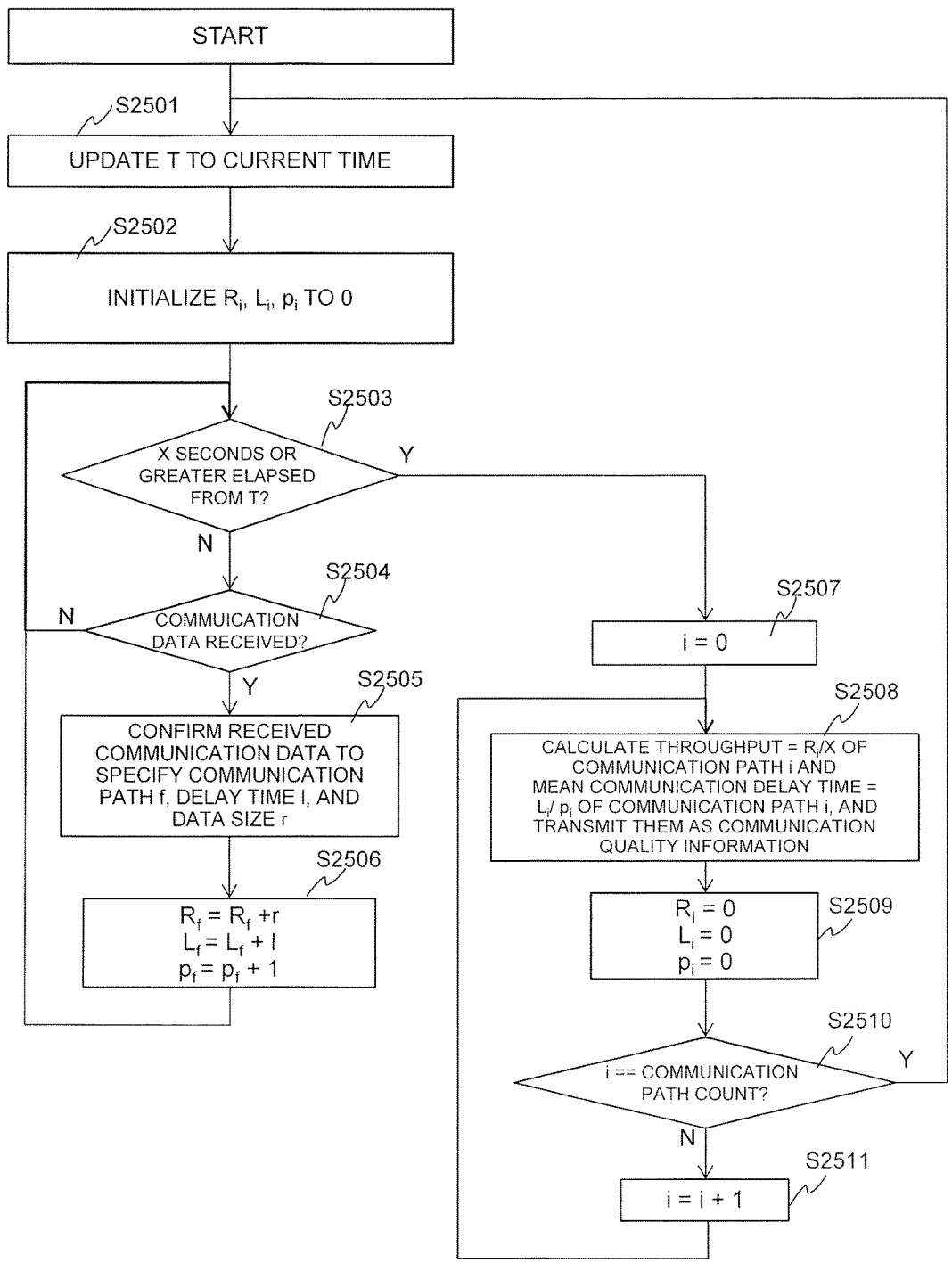
FIG. 25 is a processing flowchart of a communication quality measurement part of a server according to the third embodiment.

The processing of the communication quality measurement part 2302 of the server will be described with reference to FIG. 25. The communication quality measurement part 2302 stores a time in which the communication quality information has been transmitted to the mobile communication terminal 100 last (referred to as last communication quality transmission time) in a variable, and hereafter, the variable is referred to as T. Further, the communication quality measurement part 2302 has a variable storing, for each communication path, a data quantity (bit count; referred to as "reception bit count of communication path i") received from communication path i (1≤i≤communication path count), a total of delay time in data transmission using the communication path i (referred to as "total delay time of communication path i"), and a number of times of having received data from the communication path i (referred to as "data reception count of communication path i"), which are respectively denoted as $R_i$, $L_i$, and $p_i$.

In S2501, the communication quality measurement part 2302 updates a last communication quality transmission time T to the current time, and advances to S2502. In S2502, the communication quality measurement part 2302 initializes a reception bit count $R_i$, a total delay time $L_i$, and a communication data reception count $p_i$ of the respective communication paths i (1≤i≤communication path count) by 0, and advances to S2503.

In S2503, the communication quality measurement part 2302 confirms whether X seconds or greater has elapsed from the last communication quality transmission time T, advances S2507 to if time has elapsed, and advances to S2504 if not. In S2504, the communication quality measurement part 2302 confirms whether communication data has been received, advances to S2505 if data has been received, and advances to S2505 if not.

In S2505, the communication quality measurement part 2302 confirms the content of the received communication data, acquires a communication path f, a delay time l, and a data size r (which is the size of the application data 2416), and advances to S2506. In acquiring a delay time l, the communication quality measurement part 2302 computes the delay time l by calculating a difference between current time and the transmission time 2415 stored in the received data. In S2506, the communication quality measurement part 2302 updates $R_f$ to $R_f$+r, updates $L_f$ to $L_f$+l, and $p_f$ to $p_f$+1. Thereafter, the communication quality measurement part 2302 performs S2503.

In S2507, the communication quality measurement part 2302 prepares a variable i, initializes l by 0, and advances to S2508. In S2508, the communication quality measurement part 2302 calculates a throughput of the communication path i, and a mean communication delay time of the communication path i. The throughput of communication path i can be obtained by dividing $R_i$ by X, and the mean communication delay time of the communication path i is a value obtained by dividing $L_i$ by $p_i$. After calculating these values, the communication quality measurement part 2302 creates a communication quality information including these values, transmits the information to the mobile communication terminal 100, and advances to S2509.

In S2509, the communication quality measurement part 2302 sets $R_i$ to 0, $L_i$ to 0, and $p_i$ to 0, and advances to S2510. In S2510, the communication quality measurement part 2302 confirms whether i==communication path count is satisfied, advances to S2501 if satisfied, and advances to S2511 if not satisfied. In S2511, the communication quality measurement part 2302 adds 1 to i.

According to the above-described processing, the server 102 is enabled to measure the communication quality of each wireless communication system, and notify the same to the mobile communication terminal 100.

<Processing of Transmission Speed Estimation Part 2201 of Mobile Communication Terminal 100>

Figure 26:
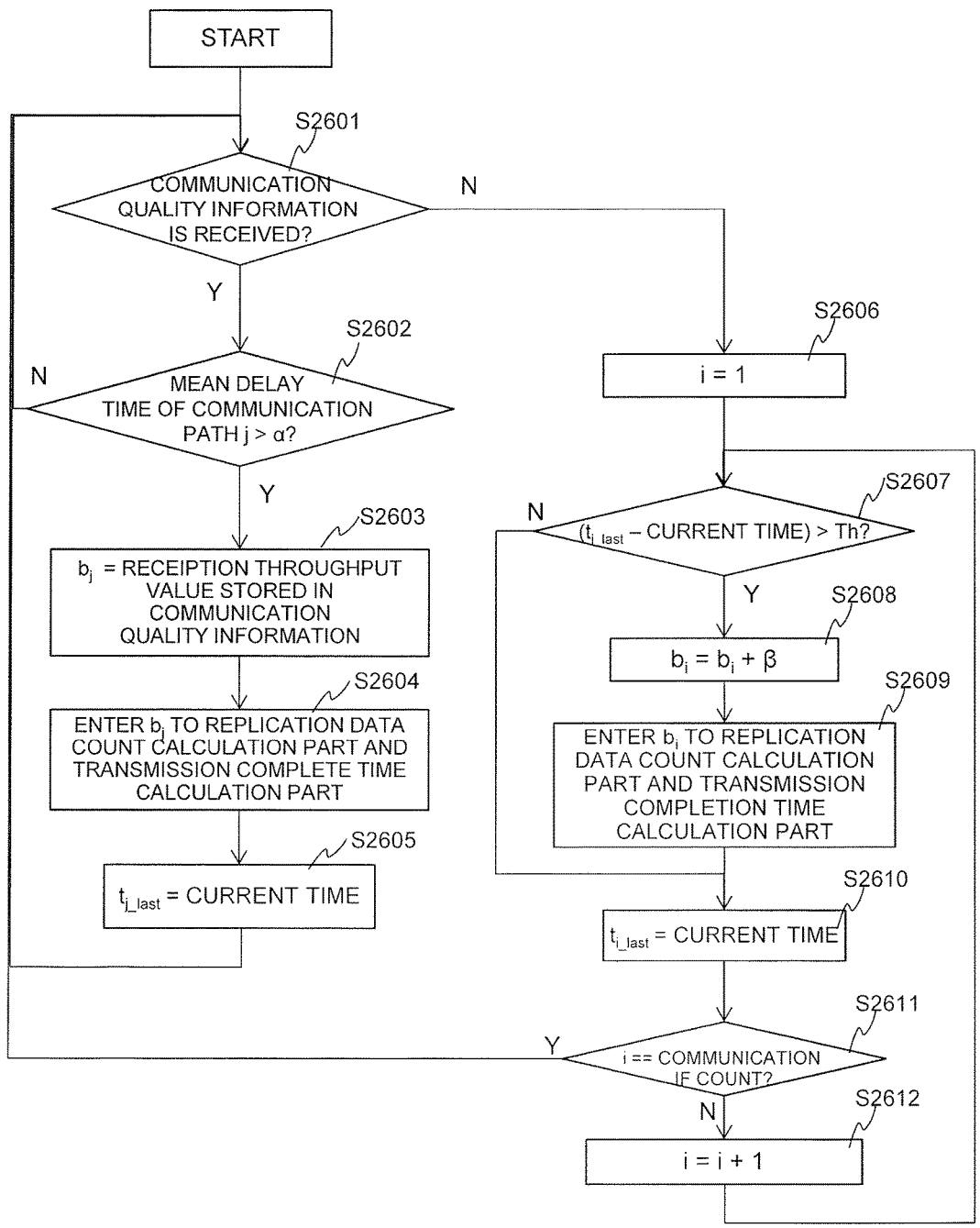
FIG. 26 is a processing flowchart of a transmission speed estimation part of the mobile communication terminal according to the third embodiment.

The processing of the transmission speed estimation part 2201 of the mobile communication terminal 100 will be described with reference to FIG. 26. The transmission speed estimation part 2201 has a variable storing a computed (estimated) transmission speed for each communication IF. In the following description, a variable storing the transmission speed of communication IF i (1≤i≤communication IF count) is denoted as $b_i$. Further, the transmission speed estimation part 2201 has a variable storing a time in which $b_i$ has been most recently updated (referred to as last communication quality revised time) for reach communication IF, and in the following description, the variable is denoted as $t_{j\_last}$.

In S2601, the transmission speed estimation part 2201 confirms whether communication quality information has been received from the server 102, advances to S2602 if the information has been received, and advances to S2605 if not.

In S2602, the transmission speed estimation part 2201 confirms a communication path identifier 2422 stored in the communication quality information. In the following, a case is illustrated in which the communication path identifier 2422 is j (j is an integer of 1 or greater and equal to or smaller than the communication IF count). In S2602, the transmission speed estimation part 2201 confirms whether a mean delay time 2424 stored in the communication quality information (mean delay time of communication path j) is greater than a communication delay time threshold α (α is a constant determined in advance), wherein the procedure advances to S2603 if it is greater, and advances to S2601 if it is not greater.

In S2603, the transmission speed estimation part 2201 updates a transmission speed $b_j$ of communication IF j to a reception throughput value 2423 stored in the communication quality information, and advances to S2604. In S2604, the transmission speed estimation part 2201 enters $b_j$ to the replication data count calculation part 304 and the transmission completion time calculation part 306, and advances to S2605. In S2605, the transmission speed estimation part 2201 updates a last communication quality revised time $t_{j\_last}$ of the communication IF j to the current time, and advances to S2601.

In S2606, the transmission speed estimation part 2201 initializes i by 1, and advances to S2607.

In S2607, the transmission speed estimation part 2201 confirms whether ($t_{i\_last}$—current time) is greater than a transmission speed increase determination cycle Th (Th is a constant determined in advance), advances to S2608 if it is greater, and advances to S2611 if it is not greater.

In S2608, the transmission speed estimation part 2201 updates the transmission speed $b_i$ of communication IF i to $b_i+\beta$, and advances to S2609. Here, $\beta$ is a constant determined in advance, and it is referred to as a transmission speed increment. In S2609, the transmission speed estimation part 2201 enters $b_i$ to the replication data count calculation part 304 and the transmission completion time calculation part 306, and advances to S2610. In S2610, the transmission speed estimation part 2201 updates $t_{i\_last}$ to the current time, and advances to S2611.

In S2611, the transmission speed estimation part 2201 confirms whether i is equal to the communication path (communication IF) count, advances to S2601 if equal, and advances to S2612 if not equal. In S2612, the transmission speed estimation part 2201 adds 1 to i, and advances to S2607.

According to the processing described above, the mobile communication terminal 100 detects lowering of transmission speed in a state where the communication delay time has become equal to or greater than a fixed value based on the communication quality information received from the server 102, and estimates that the lowered transmission speed is equal to the transmission speed notified from the server 102. Further, the mobile communication terminal 100 estimates, based on the communication quality information received from the server 102, that the transmission speed is raised in a state where the communication delay time notified from the server 102 has become equal to or lower than a threshold for a certain period of time.

According to the communication system of the third embodiment, a low-delay data transmission can be performed, even in a state where the mobile communication terminal is not capable of recognizing the accurate transmission speed by itself.

What is claimed is:

1. A communication terminal comprising:
   a plurality of communication interfaces; and
   a processor configured to execute an application program generating data, create a plurality of replicated data of the data, and transmit the respective replicated data via different communication interfaces,
   wherein the communication interfaces are each configured to connect to different networks,
   wherein the processor is configured to observe a generation speed of data generated during execution of the application program,
   determine an amount of the replicated data (N2) to be transmitted using a second type of communication interface, based on a total transmission speed of the second type of communication interface among the plurality of the communication interfaces in which a transmission speed is slower than the generation speed, and the generation speed,
   determine a replicated quantity of data (N) based on a number of communication interfaces of a first type (N1) among the plurality of communication interfaces that have transmission speeds equal to or greater than the generation speed, and the amount of replicated data (N2),
   generate a number of the replicated data corresponding to the replicated quantity (N),
   transmit the N1 number of replicated data using all the communication interfaces of the first type in parallel,
   select a same number of communication interfaces of the second type as a number of remaining replicated data, and
   transmit the remaining replicated data in parallel using the selected second type of communication interfaces.

2. The communication terminal according to claim 1,
   wherein the processor is configured to compute, for each communication interface, a transmission completion time of a state in which the replicated data is transmitted using the communication interface, and
   in selecting the second type of communication interface to be used for transmission of the replicated data, the processor sequentially selects the second type of communication interface in an order from the interface having an earliest transmission completion time.

3. The communication terminal according to claim 2,
   wherein the processor stores, for each communication interface, a previous data transmission completion time, which is a transmission completion time computed in a state where a previous replicated data is transmitted, and
   in a state where the transmission completion time is computed, the processor
   a) computes the transmission completion time by adding to the current time a value calculated by dividing a size of the replicated data by a transmission speed of the communication interface, if the previous data transmission completion time is before a current time, and
   b) computes the transmission completion time by adding to the previous data transmission completion time a value calculated by dividing the size of the replicated data by a transmission speed of the communication interface, if the previous data transmission completion time is later than the current time.

4. The communication terminal according to claim 2,
   wherein the processor sets a value having rounded off a decimal part of a result of dividing a total transmission speed of the second type of communication interfaces by the generation speed as the N2,
   determines the N by computing a sum of the N1 and the N2, and generating N number of the replicated data,
   transmits the N1 number of the replicated data among the generated replicated data using the first type of communication interface in parallel,
   selects N2 number of the second type of communication interfaces, and transmits N2 number of the replicated data in parallel using the selected N2 number of the second type of communication interfaces.

5. The communication terminal according to claim 2,
   wherein the processor sets a result of having divided a total of the transmission speed of the second type of communication interfaces by the generation speed as the value of the N2, and
   generates the replicated data such that an expected value of a count of the replicated data being generated is equal to (N1+N2).

6. The communication terminal according to claim 2,
   wherein the communication terminal has a GPS (Global Positioning System) module, and a table storing information of the transmission speed of the communication interfaces associated with the position of the communication terminal and the time, and the processor acquires information on the transmission speed of the communication interface from the table based on a time and a position of the communication terminal acquired from the GPS module in determining the amount of the replicated data.

7. A communication system comprising a communication terminal, and a server configured to be communicable with the communication terminal via a network, wherein the communication terminal comprises a plurality of communication interfaces respectively connected to different networks, and a processor configured to execute an application program generating data, create a plurality of replicated data of the data, and transmit each of the replicated data via different communication interfaces, wherein the processor is configured to observe a generation speed of data generated in a state where the application program is executed, determine an amount of the replicated data (N2) to be transmitted using a second type of communication interface based on a total transmission speed of the second type of communication interface among the plurality of communication interfaces in which the transmission speed is slower than the generation speed, and the generation speed, determine a replicated quantity of data (N) based on a number of a first type of communication interfaces (N1) among the plurality of communication interfaces having a transmission speed equal to or greater than the generation speed, and the amount of replicated data (N2), generate a number of the replicated data corresponding to the replicated quantity (N), assign a same sequence number to the replicated data, transmit the N1 number of replicated data using all the first type communication interfaces in parallel, select a same number of the second type of communication interfaces as a number of remaining replicated data, and transmit the remaining replicated data in parallel using the selected second type of communication interfaces, and wherein the server is configured to discard the replicated data other than the first received replicated data in a state where a plurality of the replicated data having the same sequence number are received.

8. The communication system according to claim 7, wherein the server transmits information related to a communication quality of the communication interface to the communication terminal based on data received from the communication terminal, and the communication terminal estimates a transmission speed of the communication interface based on the information related to the communication quality received from the server.

9. The communication system according to claim 8, wherein the information related to the communication quality includes a communication delay time.

10. The communication system according to claim 9, wherein the communication terminal raises a transmission speed estimate of the communication interface for a fixed value in a state where the communication delay time included in the information related to the communication quality received from the server is equal to or smaller than a predetermined threshold value for a certain time or longer.

11. The communication system according to claim 9, wherein the information related to the communication quality further includes throughput, and in a state where the communication delay time included in the information related to the communication quality is equal to or greater than a predetermined threshold, the communication terminal sets the throughput included in the information related to the communication quality as a transmission speed estimate of the communication interface.

12. A data transmission method in a communication system comprising a communication terminal and a server for receiving data generated by the communication terminal, the communication terminal comprising a plurality of communication interfaces respectively connected to different networks, and a processor configured to execute an application program generating data, create a plurality of replicated data of the data, and transmit the respective replicated data via different communication interfaces, the data transmission method comprising:

a) the processor observing a generation speed of data generated in a state where the application program is executed, b) the processor determining an amount of the replicated data (N2) to be transmitted using a second type of communication interface based on a total transmission speed of the second type of communication interfaces among the plurality of communication interfaces in which the transmission speed is slower than the generation speed, and the generation speed, c) the processor determining a replicated quantity of data (N) based on a number of a first type of communication interfaces (N1) among the plurality of communication interfaces having a transmission speed equal to or greater than the generation speed, and the amount of replicated data (N2), d) the processor generating a number of the replicated data corresponding to the replicated quantity (N), e) the processor assigning a same sequence number to the generated replicated data, and f) the processor transmitting the N1 number of replicated data in parallel using all the first type of communication interfaces, selecting a same number of the second type of communication interfaces as a number of remaining replicated data, and transmitting the remaining replicated data in parallel using the selected second type of communication interfaces, and g) the server discarding the replicated data other than the first received replicated data in a state where a plurality of the replicated data having the same sequence number are received.

13. The data transmission method in a communication system according to claim 12, wherein, in the step f), the processor computes, for each communication interface, a transmission completion time of a state in which the replicated data is transmitted using the communication interface, and in selecting the second type of communication interfaces, the processor sequentially selects the second type of communication interface in an order from the interface having an earliest transmission completion time.

14. The data transmission method in a communication system according to claim 13, wherein, in the step b), the processor sets a value having rounded off a decimal part of a result of dividing a total transmission speed of the second type of communication interfaces by the generation speed as the N2.

15. The data transmission method in a communication system according to claim 13,
 wherein, in the step b), the processor sets a result of having divided a total of the transmission speed of the second type of communication interfaces by the generation speed as the value of the N2, and
 in the step d), the processor generates the replicated data such that an expected value of a number of the replicated data being generated is equivalent to (N1+N2).

* * * * *